United States Patent
Lee et al.

(10) Patent No.: US 11,967,313 B2
(45) Date of Patent: Apr. 23, 2024

(54) METHOD FOR EXPANDING LANGUAGE USED IN SPEECH RECOGNITION MODEL AND ELECTRONIC DEVICE INCLUDING SPEECH RECOGNITION MODEL

(71) Applicant: Samsung Electronics Co., Ltd., Suwon-si (KR)

(72) Inventors: Jisup Lee, Suwon-si (KR); Seul Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 17/385,774

(22) Filed: Jul. 26, 2021

(65) Prior Publication Data

US 2021/0358486 A1 Nov. 18, 2021

Related U.S. Application Data

(63) Continuation of application No. PCT/KR2020/000237, filed on Jan. 7, 2020.

(30) Foreign Application Priority Data

Mar. 6, 2019 (KR) .................. 10-2019-0025543

(51) Int. Cl.
*G10L 15/183* (2013.01)
*G06F 40/58* (2020.01)
(Continued)

(52) U.S. Cl.
CPC ............ *G10L 15/183* (2013.01); *G06F 40/58* (2020.01); *G10L 15/063* (2013.01); *G10L 15/16* (2013.01); *G10L 15/22* (2013.01); *G10L 15/30* (2013.01)

(58) Field of Classification Search
None
See application file for complete search history.

(56) References Cited

U.S. PATENT DOCUMENTS 8,204,739 B2   6/2012  Waibel et al.
8,949,725 B1   2/2015  Goncharuk et al.
(Continued)

FOREIGN PATENT DOCUMENTS

KR   10-2011-0120552 A   11/2011
KR   10-1445904 B1        9/2014
(Continued)

OTHER PUBLICATIONS

International Search Report dated May 8, 2020 in connection with International Patent Application No. PCT/KR2020/000237, 2 pages.

*Primary Examiner* — Quynh H Nguyen

(57) ABSTRACT

Disclosed is a system comprising a memory storing a first natural language understanding model. The memory stores instructions that, when executed, cause a processor to: receive a request for generating a second natural language understanding model in a second language different from the first language; translate the first set of utterances into a second set of utterances in the second language; provide a second set of tags or intents to the second set of utterances; provide a user interface for receiving at least one input for modifying from among the second set of utterances or the second set of tags or intents; generate a third set of utterances and a third set of tags or intents on the basis of the input received through the user interface; and establish the second natural language understanding model including the third set of utterances and the third set of tags or intents.

18 Claims, 18 Drawing Sheets

(51) Int. Cl.
*G10L 15/06* (2013.01)
*G10L 15/16* (2006.01)
*G10L 15/22* (2006.01)
*G10L 15/30* (2013.01)

(56) References Cited

U.S. PATENT DOCUMENTS

| | | | |
|---|---|---|---|
| 9,275,641 | B1 | 3/2016 | Gelfenbeyn et al. |
| 9,369,425 | B2 | 6/2016 | Gelfenbeyn et al. |
| 9,380,017 | B2 | 6/2016 | Gelfenbeyn et al. |
| 9,386,113 | B1 | 7/2016 | Goncharuk et al. |
| 10,311,492 | B2 | 6/2019 | Gelfenbeyn et al. |
| 10,324,704 | B2 | 6/2019 | Gelfenbeyn et al. |
| 10,482,184 | B2 | 11/2019 | Gelfenbeyn et al. |
| 10,546,067 | B2 | 1/2020 | Gelfenbeyn et al. |
| 10,891,435 | B1 * | 1/2021 | Ruiz .................... G06F 40/30 |
| 10,990,377 | B2 | 4/2021 | Gelfenbeyn et al. |
| 2007/0022134 | A1 | 1/2007 | Zhou et al. |
| 2007/0198245 | A1 | 8/2007 | Kamatani et al. |
| 2008/0221868 | A1 | 9/2008 | Melnick et al. |
| 2014/0129651 | A1 | 5/2014 | Gelfenbeyn et al. |
| 2016/0078866 | A1 | 3/2016 | Gelfenbeyn et al. |
| 2016/0098994 | A1 | 4/2016 | Gelfenbeyn et al. |
| 2016/0099908 | A1 | 4/2016 | Gelfenbeyn et al. |
| 2016/0259767 | A1 | 9/2016 | Gelfenbeyn et al. |
| 2016/0259775 | A1 | 9/2016 | Gelfenbeyn et al. |
| 2016/0260029 | A1 | 9/2016 | Gelfenbeyn et al. |
| 2016/0349935 | A1 | 12/2016 | Gelfenbeyn et al. |
| 2016/0350101 | A1 | 12/2016 | Gelfenbeyn et al. |
| 2017/0185582 | A1 | 6/2017 | Gelfenbeyn et al. |
| 2019/0279264 | A1 | 9/2019 | Gelfenbeyn et al. |
| 2019/0369982 | A1 | 12/2019 | Gelfenbeyn et al. |
| 2020/0081976 | A1 | 3/2020 | Gelfenbeyn et al. |
| 2022/0284198 | A1 * | 9/2022 | Kuczmarski ............ G10L 15/22 |

FOREIGN PATENT DOCUMENTS

| | | |
|---|---|---|
| KR | 10-2016-0050652 A | 5/2016 |
| KR | 10-1896973 B1 | 9/2018 |
| WO | 2016/040769 A1 | 3/2016 |
| WO | 2016/191629 A1 | 12/2016 |
| WO | 2016/191630 A1 | 12/2016 |

* cited by examiner

800

|  | I | am | a | boy |
|---|---|---|---|---|
| 나는 | 0.9 | 0.1 | 0 | 0 |
| 소년(signal) | 0.2 | 0 | 0 | 0.8 |
| 이다 | 0.1 | 0.9 | 0 | 0 |

FIG.8

METHOD FOR EXPANDING LANGUAGE USED IN SPEECH RECOGNITION MODEL AND ELECTRONIC DEVICE INCLUDING SPEECH RECOGNITION MODEL

CROSS-REFERENCE TO RELATED APPLICATIONS

This application is a continuation of International Application No. PCT/KR2020/000237 filed on Jan. 7, 2020, which claims priority to Korean Patent Application No. 10-2019-0025543 filed on Mar. 6, 2019, the disclosures of which are herein incorporated by reference in their entirety.

BACKGROUND

1. Field

Embodiments disclosed in this specification relate to a method of expanding a language used in a speech recognition model and an electronic device including the speech recognition model.

2. Description of Related Art

An electronic device performs speech recognition to operate in response to a voice input. The electronic device includes a speech recognition model for performing the speech recognition. The electronic device recognizes a voice input that consists of a language supported by the speech recognition model.

Nowadays, there is a tool that is a program used to develop the speech recognition model. An utterance including intent that is a purpose for performing a specific action is entered into the tool. The utterance includes a plurality of variations for covering content. The tool receives a plurality of utterances including intent and variations and selects an utterance that is valid to develop the speech recognition model. The tool develops the speech recognition model capable of recognizing a specific language by processing data obtained by analyzing utterances.

A lot of resources such as time to process utterances and/or manpower to develop utterances and to manage tools may be used to develop a speech recognition model.

To expand a language used in the speech recognition model to multiple languages after a speech recognition model that supports a specific language is developed, it is necessary to develop the speech recognition model by repeatedly performing a series of processes by using a tool at a zero-base, again. In this case, resources corresponding to a multiple as many as the number of languages to be expanded may be used. Furthermore, a native speaker or language expert who is perfectly fluent in a language to be expanded may be required.

Embodiments disclosed in this specification provide a method for easily expanding a language supported by a speech recognition model to multiple languages by using neural machine translation (hereinafter referred to as "NMT").

SUMMARY

According to an embodiment disclosed in this specification, a system may include a network interface, at least one processor operatively connected to the network interface, and at least one memory operatively connected to the processor. The memory may store a first natural language understanding (NLU) model including a first set of utterances in a first language and a first set of tags and intents associated with the first set of utterances. The memory may store instructions that, when executed, cause the processor to receive a request for generating, through the network interface, a second NLU model in a second language different from the first language, to translate the first set of utterances into a second set of utterances in the second language, to provide, based at least partly on the first NLU model, a second set of tags and/or intents to the second set of utterances, to provide a user interface for receiving, through the network interface, at least one input for fixing at least one from among the second set of utterances or the second set of tags and/or intents, to generate a third set of utterances and a third set of tags and/or intents based at least partly on the input received through the user interface, and to establish the second NLU model including the third set of utterances and the third set of tags and/or intents.

Furthermore, according to an embodiment disclosed in this specification, an electronic device, to which a method for expanding a language used in a speech recognition model is applied, may include a data processor that extracts language data from capsule data, a capsule database that generates translation data by using the language data, an NMT model that receives a development language and to translate the development language into a target language. The data processor may generate target capsule data in the target language by combining the translation data with a structure. The NMT model may tag a target word corresponding to a signal of the development language and may add fixed learning data to a learning model.

Moreover, according to an embodiment disclosed in this specification, a method for expanding a language used in a speech recognition model may include requesting a language expansion tool (LET) to translate voice assistant development data of a specific language, translating an utterance by using translation model, tagging a signal after generating an alignment matrix of development and target words, providing a user with target data, of which the format is completely converted into a development format, determining whether there is a portion to be fixed in the target data, selectively fixing the target data, reflecting a result, and learning a voice assistant, and extracting the fixed portion, adding the extracted portion to learning data, and learning an NMT model again.

According to the embodiments disclosed in this specification, it is possible to expand a speech recognition model supporting a specific language to multiple languages by using fewer resources.

Besides, a variety of effects directly or indirectly understood through the specification may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

FIG. 8 is a table illustrating an alignment matrix for tagging a target word corresponding to a signal of a development language in a tool for developing a speech recognition model, according to an embodiment.

DETAILED DESCRIPTION

Hereinafter, various embodiments of the disclosure will be described with reference to accompanying drawings. However, it should be understood that this is not intended to limit the disclosure to specific implementation forms and includes various modifications, equivalents, and/or alternatives of embodiments of the disclosure.

Figure 1:
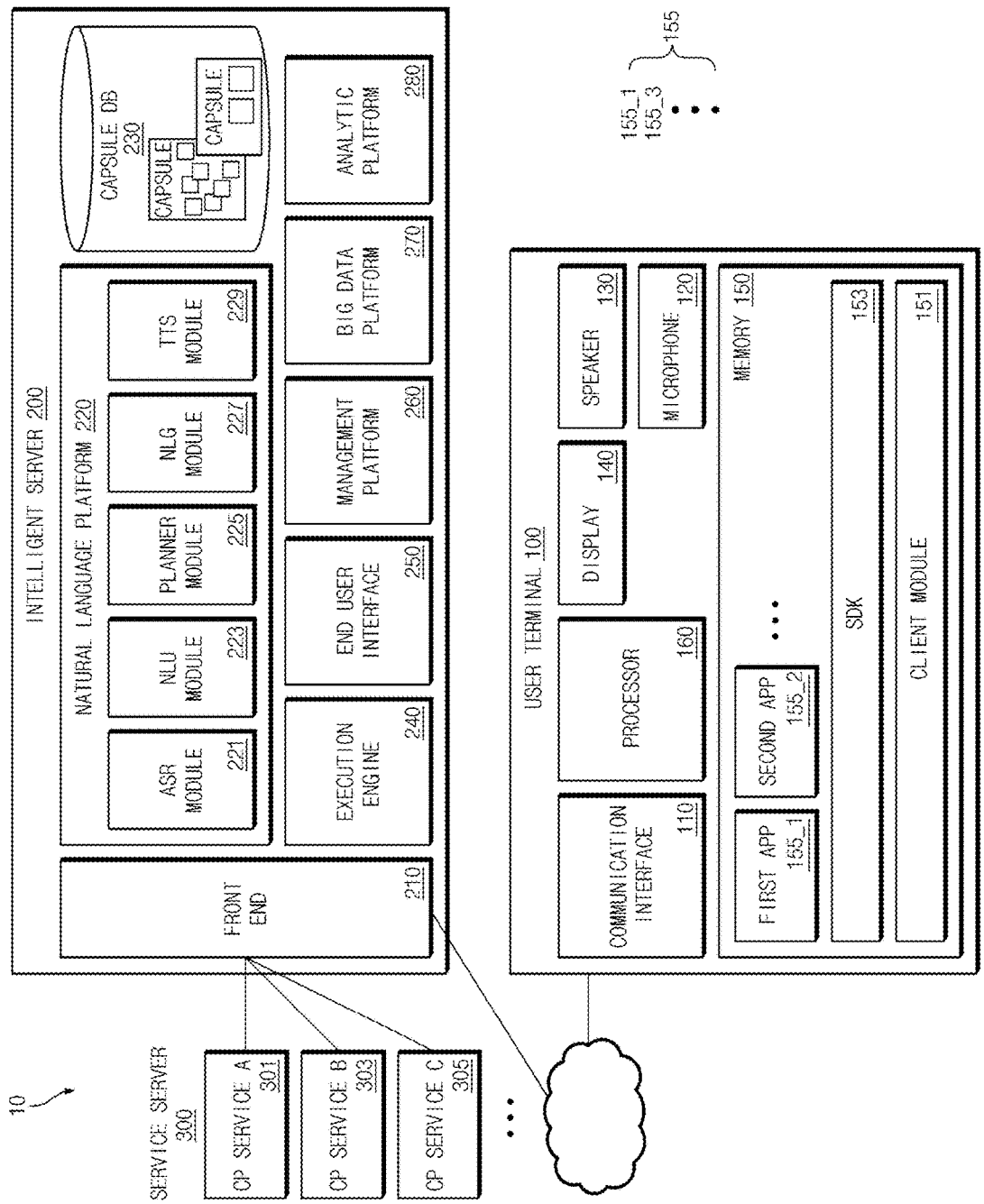
FIG. 1 is a block diagram illustrating an integrated intelligence system, according to an embodiment.

FIG. 1 is a block diagram illustrating an integrated intelligence system, according to an embodiment.

Referring to FIG. 1, an integrated intelligence system 10 according to an embodiment may include a user terminal 100, an intelligence server 200, and a service server 300.

The user terminal 100 according to an embodiment may be a terminal device (or an electronic device) capable of connecting to Internet, and may be, for example, a mobile phone, a smartphone, a personal digital assistant (PDA), a notebook computer, TV, a white household appliance, a wearable device, a HMD, or a smart speaker.

According to an embodiment, the user terminal 100 may include a communication interface 110, a microphone 120, a speaker 130, a display 140, a memory 150, and a processor 160. The listed components may be operatively or electrically connected to one another.

According to an embodiment, the communication interface 110 may be connected to an external device and may be configured to transmit or receive data to or from the external device. According to an embodiment, the microphone 120 may receive a sound (e.g., a user utterance) to convert the sound into an electrical signal. According to an embodiment, the speaker 130 may output the electrical signal as a sound (e.g., voice). According to an embodiment, the display 140 may be configured to display an image or a video. According to an embodiment, the display 140 may display the graphic user interface (GUI) of the running app (or an application program).

According to an embodiment, the memory 150 may store a client module 151, a software development kit (SDK) 153, and a plurality of apps 155. The client module 151 and the SDK 153 may constitute a framework (or a solution program) for performing general-purposed functions. Furthermore, the client module 151 or the SDK 153 may constitute the framework for processing a voice input.

According to an embodiment, the plurality of apps 155 in the memory 150 may be programs for performing the specified function. According to an embodiment, the plurality of apps 155 may include a first app 155_1 and a second app 155_3. According to an embodiment, each of the plurality of apps 155 may include a plurality of actions for performing a specified function. For example, the plurality of apps 155 may include at least one of an alarm app, a message app, or a schedule app. According to an embodiment, the plurality of apps 155 may be executed by the processor 160 to sequentially execute at least part of the plurality of actions.

According to an embodiment, the processor 160 may control overall operations of the user terminal 100. For example, the processor 160 may be electrically connected to the communication interface 110, the microphone 120, the speaker 130, the display 140, and the memory 150 so as to perform a specified action.

According to an embodiment, the processor 160 may execute the program stored in the memory 150 to perform a specified function. For example, according to an embodiment, the processor 160 may execute at least one of the client module 151 or the SDK 153 to perform a following operation for processing a voice input. The processor 160 may control operations of the plurality of apps 155 via the SDK 153. The following operation described as an operation of the client module 151 or the SDK 153 may be executed by the processor 160.

According to an embodiment, the client module 151 may receive a voice input. For example, the client module 151 may generate a voice signal corresponding to a user utterance detected via the microphone 120. The client module 151 may transmit the received voice input to the intelligence server 200. According to an embodiment, the client module 151 may transmit the state information of the user terminal 100 together with the received voice input, to the intelligence server 200. For example, the state information may be execution state information of an app.

According to an embodiment, the client module 151 may receive the result corresponding to the received voice input. For example, the client module 151 may receive the result corresponding to the received voice input from the intelligence server 200. The client module 151 may display the received result on the display 140.

According to an embodiment, the client module 151 may receive the plan corresponding to the received voice input. The client module 151 may display, on the display 140, a result of executing a plurality of actions of an app depending on the plan. For example, the client module 151 may sequentially display the execution result of a plurality of actions in a display. For another example, the user terminal 100 may display only a part of results (e.g., the result of the last action) of executing a plurality of actions, on the display.

According to an embodiment, the client module 151 may receive a request for obtaining information necessary to calculate the result corresponding to a voice input, from the intelligence server 200. For example, the information necessary to calculate the result may be the state information of the electronic device 100. According to an embodiment, the client module 151 may transmit the necessary information to the intelligence server 200 in response to the request.

According to an embodiment, the client module 151 may transmit information about the result of executing a plurality of actions depending on the plan, to the intelligence server 200. The intelligence server 200 may determine that the received voice input is processed correctly, through the result information.

According to an embodiment, the client module 151 may include a speech recognition module. According to an embodiment, the client module 151 may recognize a voice input for performing a limited function, via the speech recognition module. For example, the client module 151 may launch an intelligence app that processes a voice input for performing an organic action, via a specified input (e.g., wake up!).

According to an embodiment, the intelligence server 200 may receive the information associated with a user's voice input from the user terminal 100 over a communication network. According to an embodiment, the intelligence server 200 may convert data associated with the received voice input to text data. According to an embodiment, the intelligence server 200 may generate a plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment, the plan may be selected from a set of predefined plans or may be generated in real time in response to a user request. For example, the AI system may select at least one plan of the plurality of predefined plans.

According to an embodiment, the intelligence server 200 may transmit the result calculated depending on the generated plan to the user terminal 100 or may transmit the generated plan to the user terminal 100. According to an embodiment, the user terminal 100 may display the result calculated depending on the plan, on a display. According to an embodiment, the user terminal 100 may display a result of executing the action according to the plan, on the display.

The intelligence server 200 according to an embodiment may include a front end 210, a natural language platform 220, a capsule DB 230, an execution engine 240, an end user interface 250, a management platform 260, a big data platform 270, and an analytic platform 280.

According to an embodiment, the front end 210 may receive a voice input received from the user terminal 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, and a text to speech module (TTS) module 229.

According to an embodiment, the ASR module 221 may convert the voice input received from the user terminal 100 to text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to an intent.

According to an embodiment, the planner module 225 may generate the plan by using the intent and a parameter, which are determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or a result value output by the execution of the plurality of actions. The parameter and the result value may be defined as a concept associated with the specified form (or class). As such, the plan may include the plurality of actions and a plurality of concepts, which are determined by the intent of the user. The planner module 225 may determine the relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine an execution sequence of the plurality of actions, based on the parameters necessary to perform the plurality of actions and the result output by the execution of the plurality of actions. Accordingly, the planner module 225 may generate a plan including information (e.g., ontology) about the relationship between the plurality of actions and the plurality of concepts. The planner module 225 may generate the plan, using information stored in the capsule DB 230 storing a set of relationships between concepts and actions.

According to an embodiment, the NLG module 227 may change the specified information into information in the text form. The information changed to the text form may be in the form of a natural language speech. The TTS module 229 according to an embodiment may change information in the text form to information in a voice form.

According to an embodiment, the capsule DB 230 may store information about the relationship between the actions and the plurality of concepts corresponding to a plurality of domains. For example, the capsule DB 230 may store a plurality of capsules including a plurality of action objects (or action information) and concept objects (or concept information) of the plan. According to an embodiment, the capsule DB 230 may store the plurality of capsules in the form of a concept action network (CAN). According to an embodiment, the plurality of capsules may be stored in the function registry included in the capsule DB 230.

According to an embodiment, the capsule DB 230 may include a strategy registry that stores strategy information necessary to determine a plan corresponding to a voice input. When there are a plurality of plans corresponding to the voice input, the strategy information may include reference information for determining one plan. According to an embodiment, the capsule DB 230 may include a follow-up registry that stores information of the follow-up action for suggesting a follow-up action to the user in a specified context. For example, the follow-up action may include a follow-up utterance. According to an embodiment, the capsule DB 230 may include a layout registry storing layout information of information output via the user terminal 100. According to an embodiment, the capsule DB 230 may include a vocabulary registry storing vocabulary information included in capsule information. According to an embodiment, the capsule DB 230 may include a dialog registry storing information about dialog (or interaction) with the user.

According to an embodiment, the capsule DB 230 may update the stored object via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set.

According to an embodiment, the capsule DB 230 may be implemented in the user terminal 100. In other words, the user terminal 100 may include the capsule DB 230 storing information for determining the action corresponding to the voice input.

According to an embodiment, the execution engine 240 may calculate the result, using the generated plan. According to an embodiment, the end user interface 250 may transmit the calculated result to the user terminal 100. Accordingly, the user terminal 100 may receive the result and may provide the user with the received result. According to an embodiment, the management platform 260 may manage information used by the intelligence server 200. According to an embodiment, the big data platform 270 may collect data of the user. According to an embodiment, the analytic platform 280 may manage the quality of service (QoS) of the intelligence server 200. For example, the analytic platform 280 may manage the component and processing speed (or efficiency) of the intelligence server 200.

According to an embodiment, the service server 300 may provide the user terminal 100 with a specified service (e.g., ordering food or booking a hotel). According to an embodiment, the service server 300 may be a server operated by the third party. For example, the service server 300 may include a first service server 301, a second service server 303, and a third service server 305, which are operated by different third parties. According to an embodiment, the service server 300 may provide the intelligence server 200 with information for generating a plan corresponding to the received voice input. For example, the provided information may be stored in the capsule DB 230. Furthermore, the service server 300 may provide the intelligence server 200 with result information according to the plan.

In the above-described integrated intelligence system 10, the user terminal 100 may provide the user with various intelligent services in response to a user input. The user input may include, for example, an input through a physical button, a touch input, or a voice input.

According to an embodiment, the user terminal 100 may provide a speech recognition service via an intelligence app (or a speech recognition app) stored therein. In this case, for example, the user terminal 100 may recognize a user utterance or a voice input, which is received via the microphone, and may provide the user with a service corresponding to the recognized voice input.

According to an embodiment, the user terminal 100 may perform a specified action, based on the received voice input, exclusively, or together with the intelligence server and/or the service server. For example, the user terminal 100 may launch an app corresponding to the received voice input and may perform the specified action via the executed app.

According to an embodiment, when providing a service together with the intelligence server 200 and/or the service server, the user terminal 100 may detect a user utterance by using the microphone 120 and may generate a signal (or voice data) corresponding to the detected user utterance. The user terminal may transmit the voice data to the intelligence server 200 by using the communication interface 110.

According to an embodiment, the intelligence server 200 may generate a plan for performing a task corresponding to the voice input or the result of performing an action depending on the plan, as the response to the voice input received from the user terminal 100. For example, the plan may include a plurality of actions for performing a task corresponding to the voice input of the user and a plurality of concepts associated with the plurality of actions. The concept may define a parameter to be input upon executing the plurality of actions or a result value output by the execution of the plurality of actions. The plan may include relationship information between the plurality of actions and the plurality of concepts.

According to an embodiment, the user terminal 100 may receive the response by using the communication interface 110. The user terminal 100 may output the voice signal generated in the user terminal 100 to the outside by using the speaker 130 or may output an image generated in the user terminal 100 to the outside by using the display 140.

Figure 2:
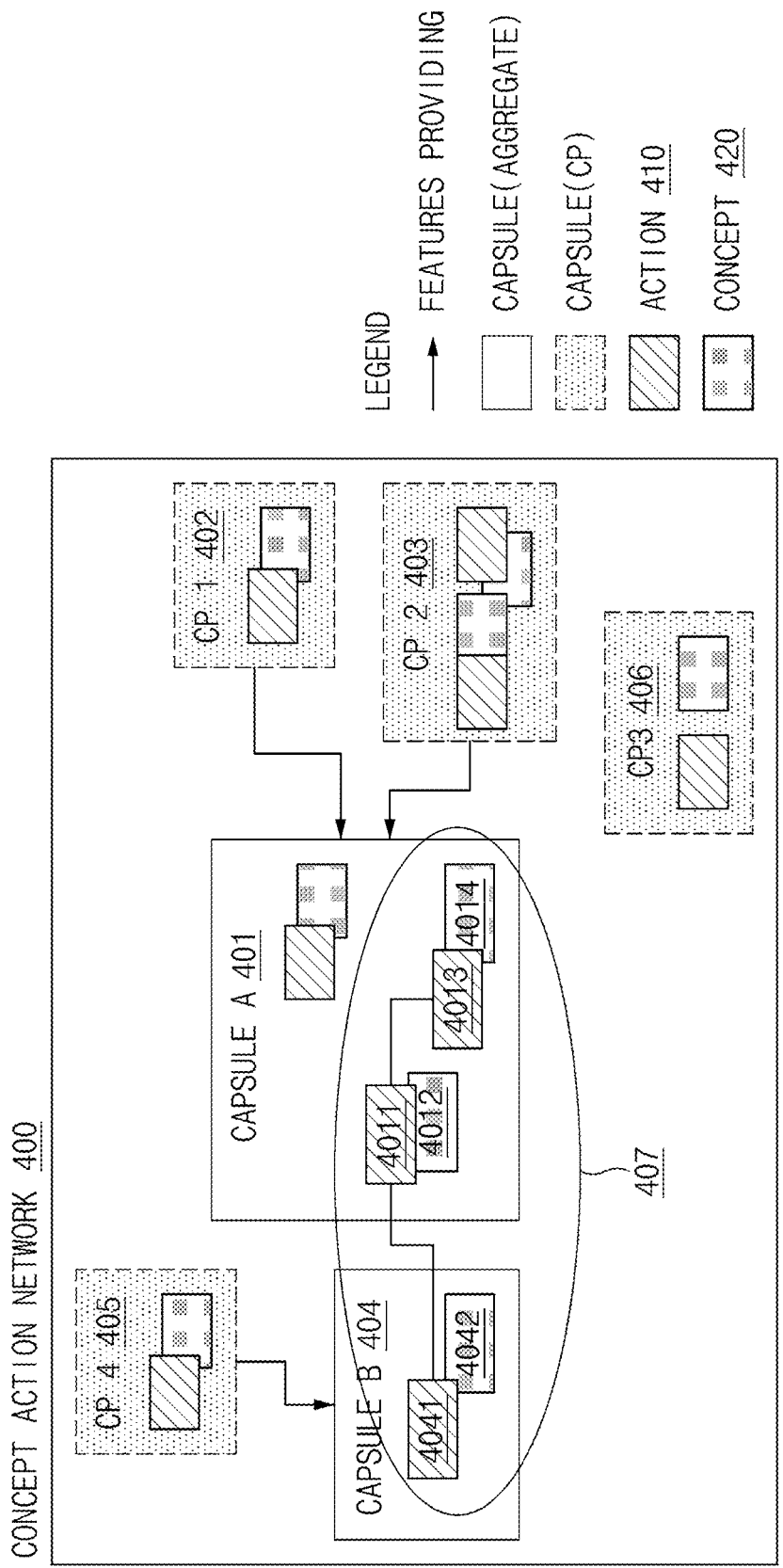
FIG. 2 is a diagram illustrating the form in which relationship information between a concept and an action is stored in a database, according to an embodiment.

FIG. 2 is a diagram illustrating a form in which relationship information between a concept and an action is stored in a database, according to various embodiments.

A capsule database (e.g., the capsule DB 230) of the intelligence server 200 may store a plurality of capsules in the form of a CAN 400. The capsule DB may store an action for processing a task corresponding to a user's voice input and a parameter necessary for the action, in the CAN form. The CAN may indicate an organic relationship between the action and a concept defining the parameter necessary to perform the action.

The capsule database may store a plurality of capsules (e.g., capsule A 401 and capsule B 404) respectively corresponding to a plurality of domains (e.g., applications). According to an embodiment, a single capsule (e.g., the capsule A 401) may correspond to one domain (e.g., an application). Furthermore, the single capsule may correspond to at least one service provider (e.g., CP 1 402, CP 2 403, CP 3 406, or CP 4 405) for performing the function of the domain associated with the capsule. According to an embodiment, the single capsule may include at least one or more actions 410 and at least one or more concepts 420 for performing a specified function.

According to an embodiment, the natural language platform 220 may generate a plan for performing a task corresponding to the received voice input, using the capsule stored in the capsule database. For example, the planner module 225 of the natural language platform may generate the plan by using the capsule stored in the capsule database. For example, a plan 407 may be generated using actions 4011 and 4013 and concepts 4012 and 4014 of the capsule A 401 and an action 4041 and a concept 4042 of the capsule B 404.

Figure 3:
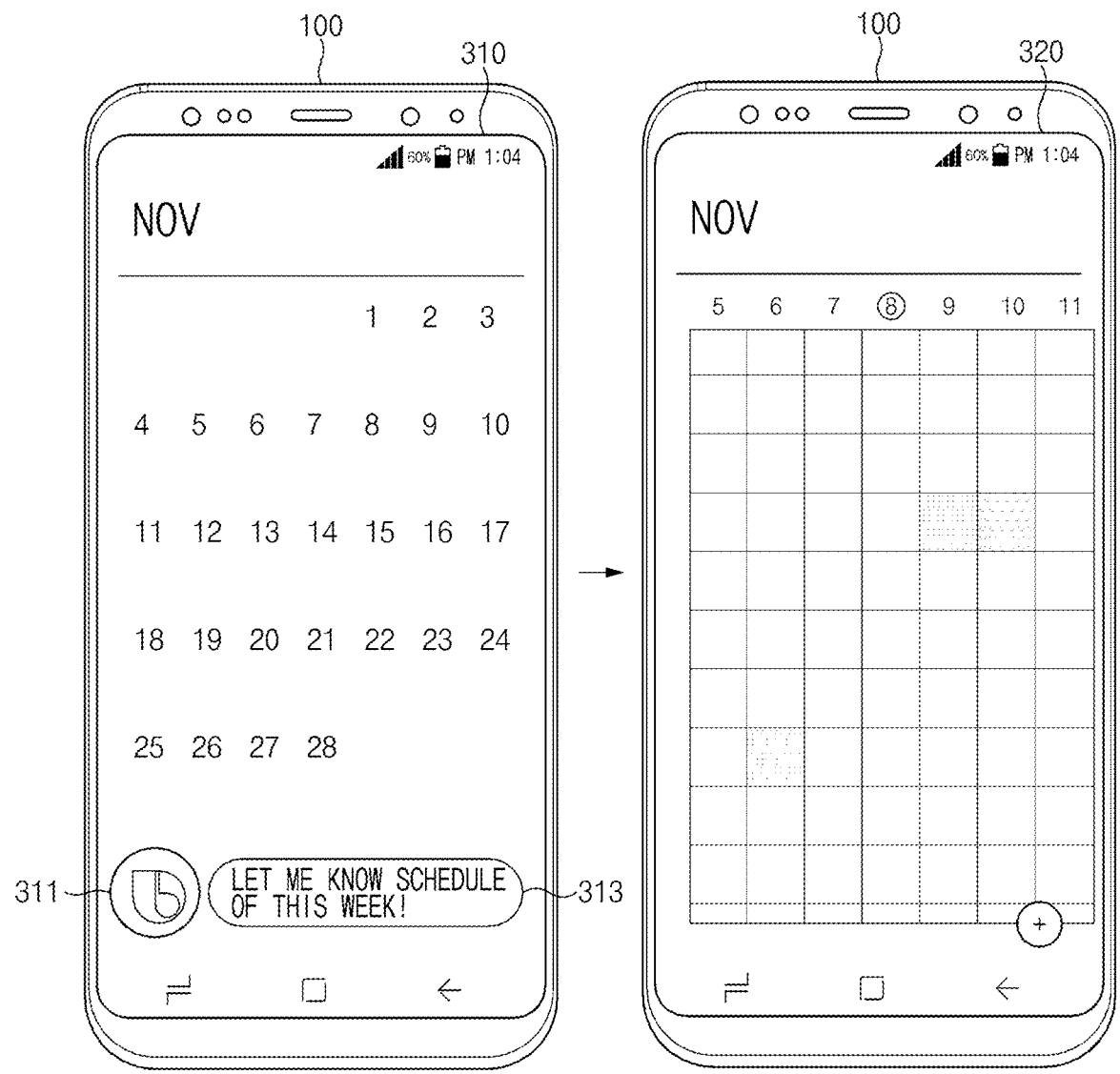
FIG. 3 is a view illustrating a user terminal displaying a screen of processing a voice input received through an intelligence app, according to an embodiment.

FIG. 3 is a view illustrating a screen in which a user terminal processes a voice input received through an intelligence app, according to various embodiments.

The user terminal 100 may execute an intelligence app to process a user input through the intelligence server 200.

According to an embodiment, on screen 310, when recognizing a specified voice input (e.g., wake up!) or receiving an input via a hardware key (e.g., a dedicated hardware key), the user terminal 100 may launch an intelligence app for processing a voice input. For example, the user terminal 100 may launch the intelligence app in a state where a schedule app is executed. According to an embodiment, the user terminal 100 may display an object (e.g., an icon) 311 corresponding to the intelligence app, on the display 140. According to an embodiment, the user terminal 100 may receive a voice input by a user utterance. For example, the user terminal 100 may receive a voice input saying that "Let me know the schedule of this week!". According to an embodiment, the user terminal 100 may display a user interface (UI) 313 (e.g., an input window) of the intelligence app, in which text data of the received voice input is displayed, on a display.

According to an embodiment, on screen 320, the user terminal 100 may display a result corresponding to the received voice input, on the display. For example, the user terminal 100 may receive the plan corresponding to the received user input and may display 'the schedule of this week' on the display depending on the plan.

Figure 4:
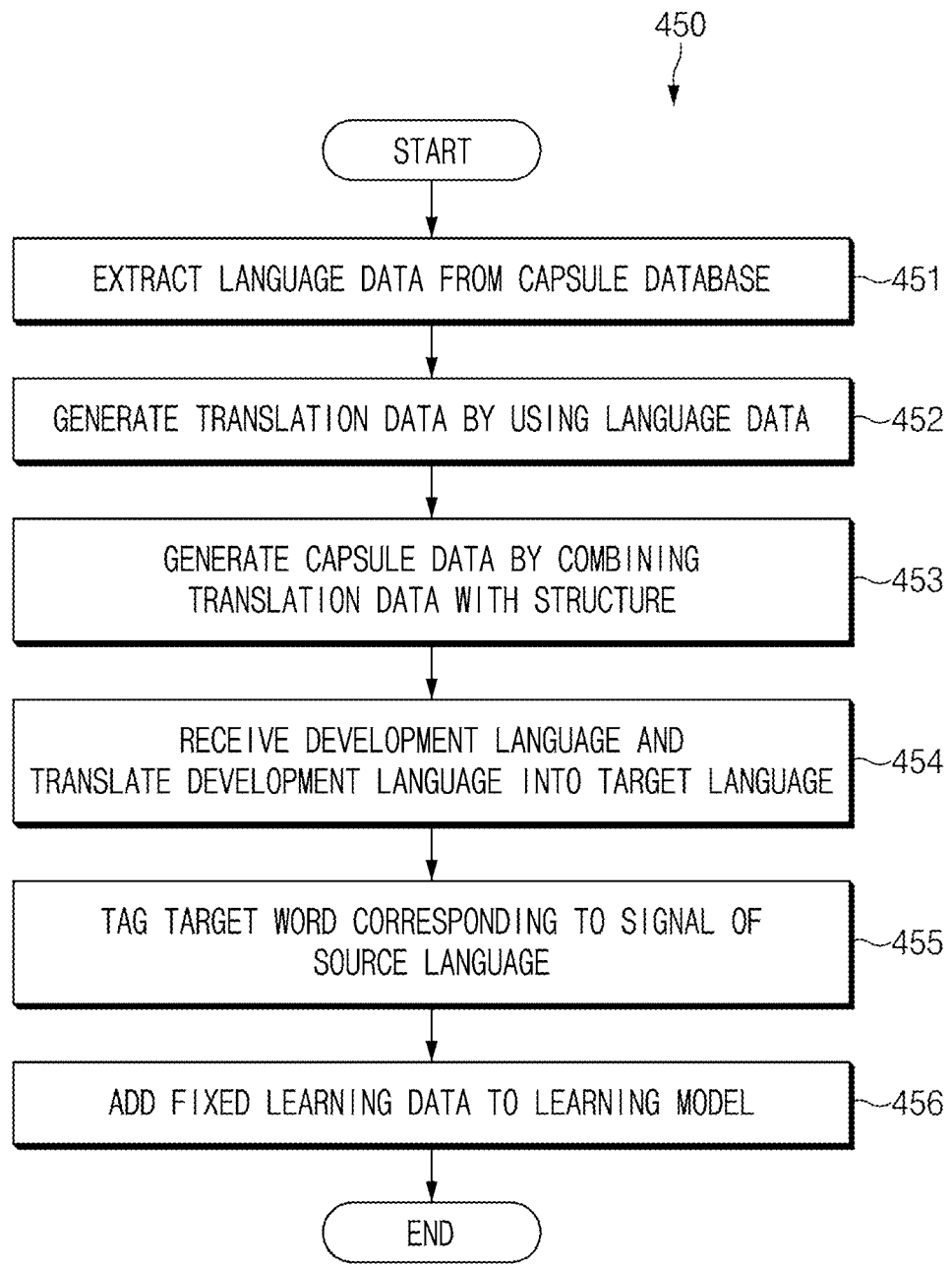
FIG. 4 is a flowchart illustrating a process of expanding a speech recognition model included in an integrated intelligence system to another language, according to an embodiment.

FIG. 4 is a flowchart 450 illustrating a process of expanding a speech recognition model included in the integrated intelligence system 10 to another language, according to an embodiment.

In an embodiment, the integrated intelligence system 10 may include a speech recognition model for recognizing a voice. The speech recognition model may recognize a voice such as a user's utterance and allow the user terminal 100 and/or the intelligence server 200 to perform an operation corresponding to the content of the voice. The speech recognition model may be implemented with a voice assistant and/or Bixby™. The speech recognition model may be generated by repeatedly performing learning on a specific language. The generated speech recognition model may support a speech recognition service provided through the learned language. For example, the speech recognition model may recognize a user's utterance in the corresponding language. The speech recognition model may analyze the meaning of the recognized utterance of the user. The speech recognition model may allow an operation corresponding to the analyzed meaning to be performed. A process of expanding a language used in the speech recognition model to another language may be performed to recognize a voice in the other language. The process of expanding a language used in the speech recognition model to the other language may be performed by using a tool for developing a speech recognition model.

In operation 451, a process of expanding the speech recognition model according to an embodiment may extract language data from a capsule database (e.g., the capsule database 230 in FIG. 2). A capsule may have substantially the same meaning as a domain. The database included in each capsule may be a place for storing data for building the speech recognition model in each domain. The capsule database may include pieces of data used to develop the speech recognition model of a specific language. The capsule database may include pieces of data associated with the speech recognition model that has been completely developed. For example, the capsule database may include pieces of data used when the speech recognition model that supports a specific language is trained. The capsule database may be iteratively learned in the speech recognition model. The capsule database may include language data and a structure. The language data may be different for each language. The structure may include non-verbal data. All structures may be substantially the same as one another regardless of the type of a language. The language data may be selectively extracted from the capsule database by using a tool for developing a speech recognition model.

For example, the language data of the speech recognition model supporting English may be user utterances in English. The language data may be an English word, an English expression, or an English sentence. The structure may include the intonation of a user utterance, the accent of the user utterance, or the speed of the user utterance. The tool for developing a speech recognition model may extract language data corresponding to an English word, an English expression, or an English sentence from user utterances in English.

In operation 452, the process of expanding a speech recognition model according to an embodiment may generate translation data by using language data. The translation data may be data required to translate a specific language, which is used by the developed speech recognition model, into a target language that is a language to be expanded. The translation data may be data generated by using neural machine translation (NMT). The NMT may continuously improve the performance or accuracy of translation by using machine learning (ML). The translation data may be continuously refined or updated by a developer.

In operation 453, the process of expanding a speech recognition model according to an embodiment may generate capsule data by combining the translation data with a structure. The capsule data may be data used to develop a speech recognition model for the target language. For example, the capsule data may be training data or dialog data.

In an embodiment, the training data may be data for training a model to which the ML is applied. The training may include an algorithm for learning the training data to be learned. The model to which the ML is applied may be an artifact generated by a training process.

In an embodiment, the training data may include a correct answer. The correct answer may be a target or an attribute of the target. The learning algorithm may discover patterns in the training data. The learning algorithm may map attributes of entered data onto the correct answer that the developer desires to predict. The learning algorithm may output an ML model that catches these patterns. The developer may use the ML model to predict unknown data indicating that the target or correct answer is unknown.

In an embodiment, learning and/or training for expanding a language used in the speech recognition model to the target language may be performed by using capsule data. When operation 451 to operation 453 are performed, the capsule data for a specific language, for which the speech recognition model is completely developed, may be converted into a target language to be expanded. Then, the converted capsule data may be provided to the speech recognition model and may be used as the target language when a speech recognition model is developed.

In operation 454, the process of expanding the speech recognition model according to an embodiment may receive a development language and may translate the development language into a target language. The development language may be a user utterance in a specific language, for which the speech recognition model is completely developed, or an expression entered by a developer. The tool for developing a speech recognition model may translate the development language into a target language by applying translation data to the development language. For example, when the speech recognition model is expanded in Spanish in a state where the speech recognition model in English is completely developed, "Send Hawaii picture to mom." in the development language may be entered and then may be translated as "Manda la foto de Hawaii a mama." in Spanish that is the target language.

In operation 455, the process of expanding a speech recognition model according to an embodiment may tag a target word corresponding to a signal of a development language. The signal may be a word, which has the most important meaning to perform an operation corresponding to an utterance, from among words included in the development language. Tagging a target word may include a task of setting, to a signal, a target word, which has a meaning corresponding to a signal of a development language, from among target words included in the target language. In operation 454, a sentence of an utterance may be translated into a sentence in the target language. In operation 455, a word having a parallel relationship with a word corresponding to a signal of the development language may be found from the sentence translated in the target language, and then two words may be matched with each other. Accordingly, each utterance may be translated into the target language. Then, a developer may set a signal of the target language by using the tool for developing a speech recognition model, while the developer does not directly match the corresponding signal. The target language tagged with a target word may be used as fixed learning data.

In operation 456, the process of expanding a speech recognition model according to an embodiment may add the fixed learning data to the learning model. The translation data obtained through the NMT may be fixed and/or refined. The tool for developing a speech recognition model may fix and/or refine translation data by using the fixed learning data as learning data for performing NMT again. Accordingly, the performance of the NMT may be continuously refined.

Figure 5:
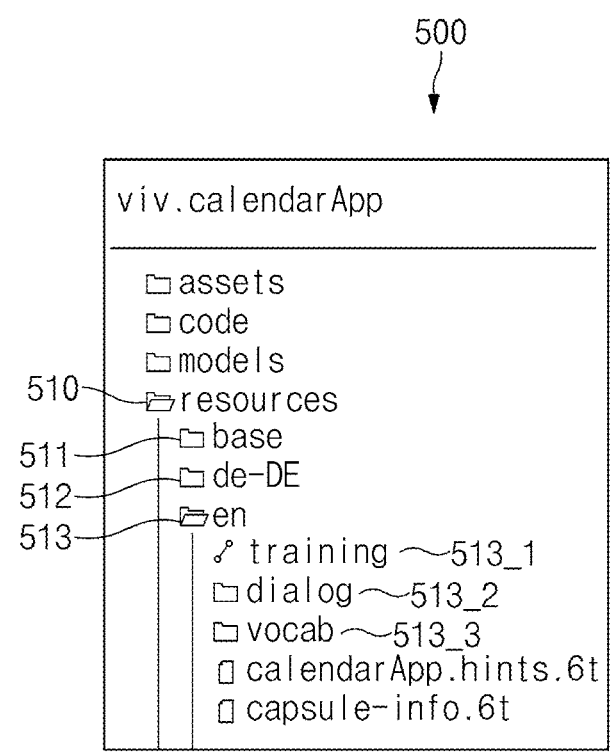
FIG. 5 is a diagram illustrating data included in each capsule illustrated in a tool for developing a speech recognition model, according to an embodiment.

FIG. 5 is a diagram 500 illustrating data included in each capsule illustrated in a tool for developing a speech recognition model, according to an embodiment.

In an embodiment, a tool for developing a speech recognition model may include a language expansion tool (LET). The LET may automatically translate an input voice utterance. The LET may tag a signal included in a translated target sentence. The LET may convert a data format, which is developed in advance and which is associated with a source language, into a data format associated with a target language so as to be provided.

In an embodiment, the tool for developing a speech recognition model may display data included in each capsule. The data included in each capsule may include data required to learn the speech recognition model and/or to respond to an utterance. The data included in each capsule may be classified for each language under a resource folder (resources) 510. For example, the resource folder 510 may include a base language folder 511, a German folder (de-DE) 512, and/or an English folder (en) 513. The base language folder 511 may store data associated with an utterance in a language (e.g., Korean) most frequently used by a developer using the tool for developing a speech recognition model or a user of the user terminal 100 to which the speech recognition model is applied.

In an embodiment, each of the base language folder 511, the German folder 512, and/or the English folder 513 may include a training folder (training) 513_1 for storing training data, a dialog folder (dialog) 513_2 for storing dialog data, and/or a vocabulary folder (vocab) 513_3 for storing vocabulary data. The training data may refer to data associated with an utterance for learning the speech recognition model. For example, the training data may include language data including the content of utterances such as signal information and/or state information. The dialog data may include data for corresponding to or responding to each of a plurality of situations. The vocabulary data may include data associated with the meaning of words and/or idioms.

In an embodiment, the developer may make a request for translation into a target language to the tool for developing a speech recognition model. The tool for developing a speech recognition model may generate a new folder associated with the target language. The new folder may include a training folder, a dialog folder, and/or a vocabulary folder associated with the target language.

Figure 6:
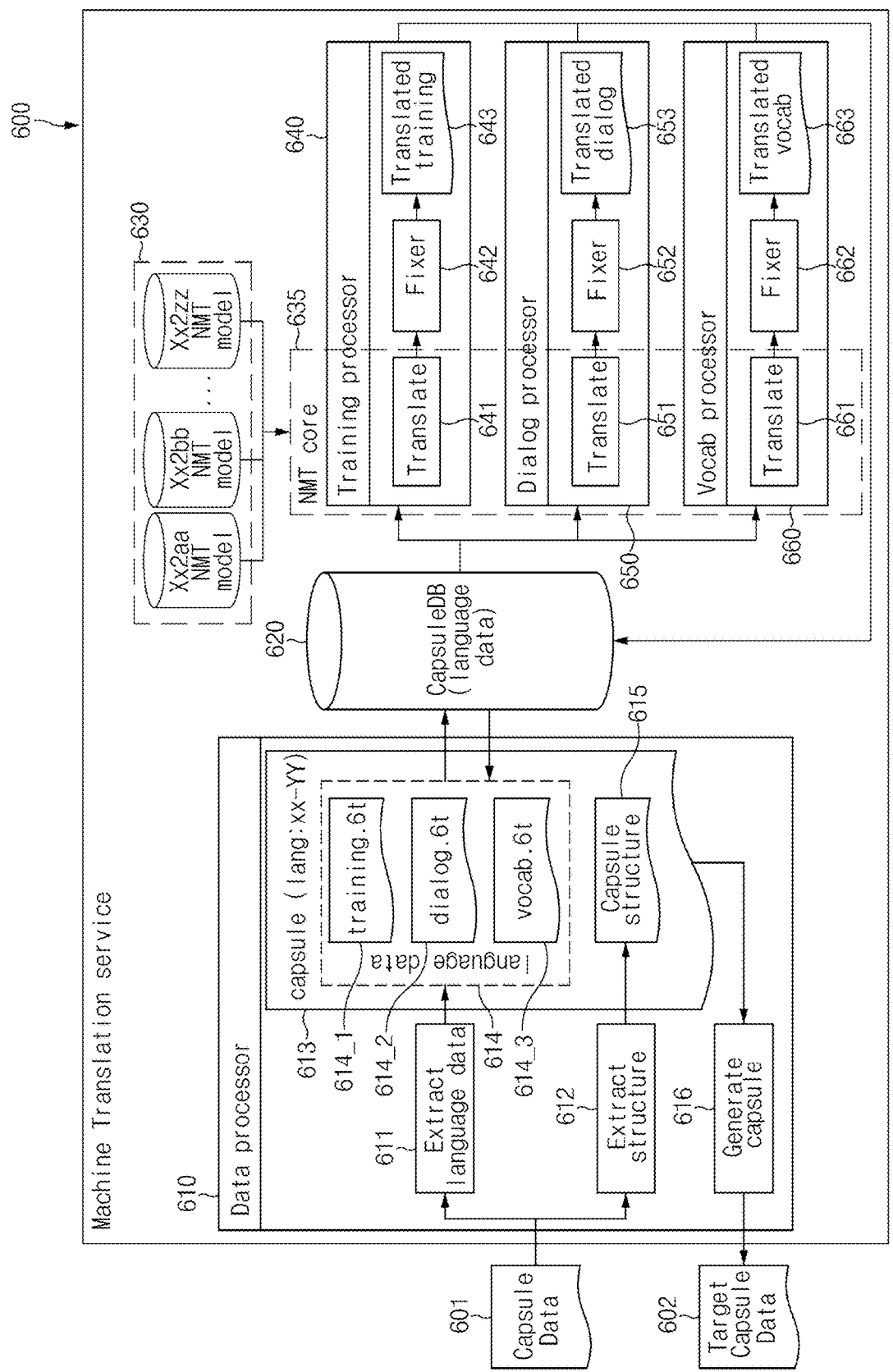
FIG. 6 is a diagram illustrating a machine translation service, in which a tool for developing a speech recognition model translates capsule data into target capsule data.

FIG. 6 is a diagram illustrating a machine translation service 600, in which a tool for developing a speech recognition model translates capsule data 601 into target capsule data 602, according to an embodiment.

In an embodiment, a tool for developing a speech recognition model may obtain the capsule data 601 in a development language. For example, a developer may enter the capsule data 601 into the tool for developing the speech recognition model. The tool for developing the speech recognition model may receive a request for translating the development language used in the obtained capsule data 601 into a target language.

In an embodiment, a data processor 610 may separate language data 611 and/or a structure 612 from the capsule data 601 so as to be extracted. The data processor 610 may convert the language data 611 into a capsule 613 including training data (training.6*t*) 614_1, dialog data (dialog.6*t*) 614_2, and/or vocabulary data (vocab.6*t*) 614_3. The data processor 610 may deliver the capsule 613 to a capsule database (DB) 620. The data processor 610 may convert the structure 612 into a capsule structure 615 included in the capsule 613. The data processor 610 may maintain a state, in which the capsule structure 615 is stored, without delivering the capsule structure 615 to the capsule database 620.

In an embodiment, the capsule database 620 may deliver, to an NMT model 630, the capsule 613 including the training data 614_1, the dialog data 614_2, and/or the vocabulary data 614_3.

In an embodiment, the NMT model 630 may translate a development language 614 used in the capsule 613 into the target language. The NMT model 630 may translate the training data 614_1, the dialog data 614_2, and/or the vocabulary data 614_3 by using a training processor (Training processor) 640, a dialog processor (Dialog processor) 650, and/or a vocabulary processor (Vocab processor) 660, respectively. The NMT model 630 may translate each of the training data 614_1, the dialog data 614_2, and/or the vocabulary data 614_3 into the target language by using an NMT core 635 included in the NMT model 630. The NMT core 635 may include translation models (translate) 641, 651, and/or 661, which are respectively included in the training processor 640, the dialog processor 650, and/or the vocabulary processor 660.

In an embodiment, the training data 614_1, the dialog data 614_2, and/or the vocabulary data 614_3 may be translated into the target language by the translation model (641, 651, and/or 661) included in the NMT core 635. After the training data 614_1, the dialog data 614_2, and/or the vocabulary data 614_3 are translated into the target language, a fixer (642, 652, and/or 662) may generate translation data through post-processing. The translation data may include translated training data (Translated training) 643, translated dialog data (Translated dialog) 653, and/or translated vocabulary data (Translated vocab) 663. The translated training data 643, the translated dialog data 653, and/or the translated vocabulary data 663 included in the translation data may return to the capsule database 620 again.

In an embodiment, the data processor 610 may obtain the translated training data 643, the translated dialog data 653, and/or the translated vocabulary data 663. The data processor 610 may reassemble or combine the translated training data 643, the translated dialog data 653, and/or the translated vocabulary data 663 with the capsule structure 615. The data processor 610 may generate the target capsule data 616 that is new capsule data about the target language, by reassembling the translated training data 643, the translated dialog data 653, and/or the translated vocabulary data 663 with the capsule structure 615. The target capsule data 602 may be stored under a folder corresponding to the target language. When there is no folder corresponding to the target language, a new folder may be generated to store the target capsule data 602.

Figure 7:
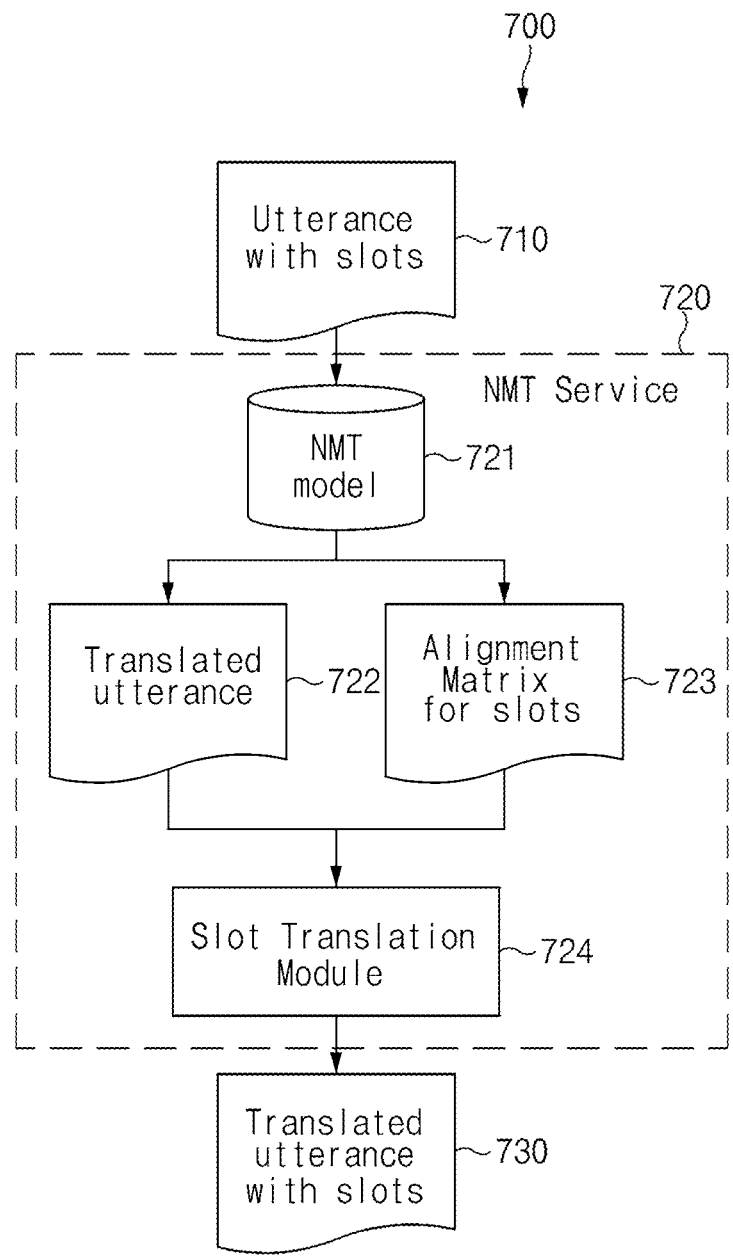
FIG. 7 is a diagram illustrating that a tool for developing a speech recognition model receives a development language, translates the development language into a target language, and tags a target word corresponding to a signal of the development language, according to an embodiment.

FIG. 7 is a diagram 700 illustrating that a tool for developing a speech recognition model receives a development language, translates the development language into a target language, and tags a target word corresponding to a signal of the development language, according to an embodiment.

In an embodiment, a tool for developing a speech recognition model may be an NMT service 720. The NMT service 720 may include an NMT model 721. The NMT service 720 may translate training data into a target language by using the NMT model 721, and then may tag a slot of the translated training data. In this specification, the slot may be referred to as a concept similar to the signal described with reference to operation 455. For example, the slot may be an important concept or target for performing an operation indicated by an utterance 710.

In an embodiment, the NMT model 721 may obtain the utterance 710 (Utterance with slots) with slots. The NMT model 721 may generate a translated utterance 722 by translating the utterance 710 in a development language into the target language. The translated utterance 722 may have substantially the same content as the utterance 710.

In an embodiment, the NMT model 721 may generate a matrix by aligning words of the utterance 710 in the development language and words of the utterance 722 translated into the target language. For example, the NMT model 721 may generate an alignment matrix (Alignment Matrix for slots) 723 for slots by dividing and aligning the utterance 710 in a source language and the utterance 722 in the target language into words or vocabulary units.

In an embodiment, the utterance 722 translated into the target language and the alignment matrix 723 may be entered into a slot transition module (Slot Transition Module) 724 included in the NMT service 720. The slot transition module 724 may identify a word, which is tagged with a slot, from among words in the source language in the alignment matrix 723 for slots. The slot transition module 724 may identify a word, which has a meaning corresponding to a word tagged with a slot in the development language, from among words in the target language in the alignment matrix 723 for slots. The slot transition module 724 may tag a word having a meaning corresponding to a word tagged with a slot in the development language in the utterance 722 translated into the target language. The slot transition module 724 may tag a target word corresponding to a signal.

In an embodiment, the slot transition module 724 may return a translated utterance 730 (translated utterance with slots). The translated utterance 730 may include tagging or slot data indicating which word corresponds to a signal in the target language. The translated utterance 730 may include a translation quality score or a confidence score for each sentence translated into the target language.

FIG. 8 is a table 800 illustrating an alignment matrix for tagging a target word corresponding to a signal of a development language in a tool for developing a speech recognition model, according to an embodiment.

In an embodiment, the NMT model 721 may translate a sentence in a development language into a sentence in a target language so as to be divided into words constituting the sentence in the development language and words constituting a sentence in the target language or vocabulary units. The NMT model 721 may generate an alignment matrix by using each divided word or vocabulary.

In an embodiment, the slot transition module 724 may determine similarity between meanings of words or vocabularies in the source language and words or vocabularies in the target language. The slot transition module 724 may calculate a semantically-similar portion between a word or vocabulary in the development language and a word or vocabulary in the target language, as a score. The slot transition module 724 may assign an association or similarity score based on the similarity of meaning. The slot transition module 724 may display a score for each word in the alignment matrix.

For example, in FIG. 8, a sentence in Korean, which is a development language, may include three words: "나는", "소년", and "이다". A sentence translated into English, which is the target language, may include four words "I", "am", "a", and "boy". The slot transition module 724 may display the association or similarity score for each word in the alignment matrix consisting of 3 rows and 4 columns. The alignment matrix may indicate that "나는" has the association or similarity score of 0.9 with "I", has the association or similarity score of 0.1 with "am", and has the association or similarity score of 0 with "a" and "boy".

In an embodiment, the word or vocabulary in the development language may include a signal indicating a target for performing an operation corresponding to the utterance. For example, in a sentence in Korean, which is a development language, "소년" may be a word designated as the signal.

In an embodiment, the slot transition module 724 may tag the target word corresponding to the signal of the development language with a slot based on the association or similarity score displayed in the alignment matrix. For example, in the alignment matrix of FIG. 8, it may be determined that "소년" has the association or similarity score of 0.8 with "boy", has the association or similarity score of 0.2 with "I", and has the association or similarity score of 0 with "am" and "a". When "소년" is designated as the signal in a Korean sentence that is a development language, the slot transition module 724 may tag "boy", which has the highest association or similarity score with "소년", with a slot.

Figure 9:
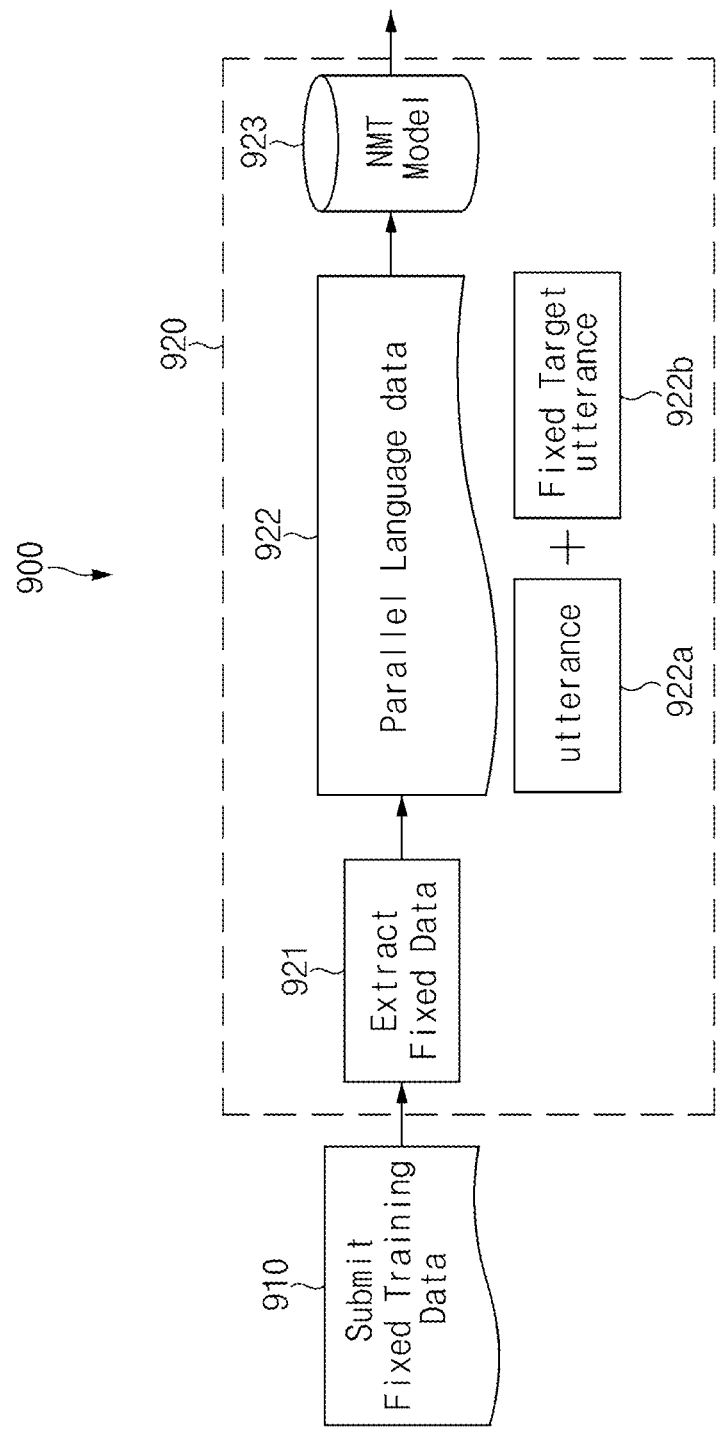
FIG. 9 is a diagram illustrating that fixed learning data is added to a learning model in a tool for developing a speech recognition model, according to an embodiment.

FIG. 9 is a diagram 900 illustrating that fixed learning data is added to a learning model in a tool 920 for developing a speech recognition model, according to an embodiment.

In an embodiment, the NMT model 721 that develops a speech recognition model may provide training data to the tool 920 for developing a speech recognition model. The training data may be used to expand a source language used in the speech recognition model to a target language that is a new language. Training data (Submit Fixed Training Data) 910, which is fixed and then submitted, may be used to generate the speech recognition model supporting the target language more accurately. For example, a developer may fix expressions, grammars, and/or vocabularies of the training data so as to be submitted to the tool 920 for developing the speech recognition model.

In an embodiment, an LET of the tool 920 for developing a speech recognition model may extract fixed data (Extract Fixed Data) 921. The LET may generate parallel language data (Parallel Language data) 922 based on the extracting of the fixed data 921. The parallel language data 922 may be language data that is added again to an NMT model 923 and then more accurately learns the NMT model 923 again.

In an embodiment, the parallel language data 922 may include an utterance (utterance) 922a in the development language and/or a target utterance (Fixed Target utterance) 922b fixed by the LET. The parallel language data 922 may be data indicating that the target utterance (922b) fixed by the LET corresponds to the utterance 922a one-to-one.

For example, when "I am a boy." is translated into "나는 소녀 다", "나는 소녀 다" may be fixed to "나는 소년 이다" so as to be summited to the LET, and then "나는 소년 이다" may be reflected. After extracting the fixed data 921, the LET generates the parallel language data 922 indicating that "I am a boy.", which is the utterance 922a in the development language and "나는 소년 이다" that is the fixed target utterance 922b are formed as a pair. The LET may improve the accuracy and/or performance of the NMT model 923 by using the parallel language data 922 as learning data for learning the NMT model 923.

Figure 10:
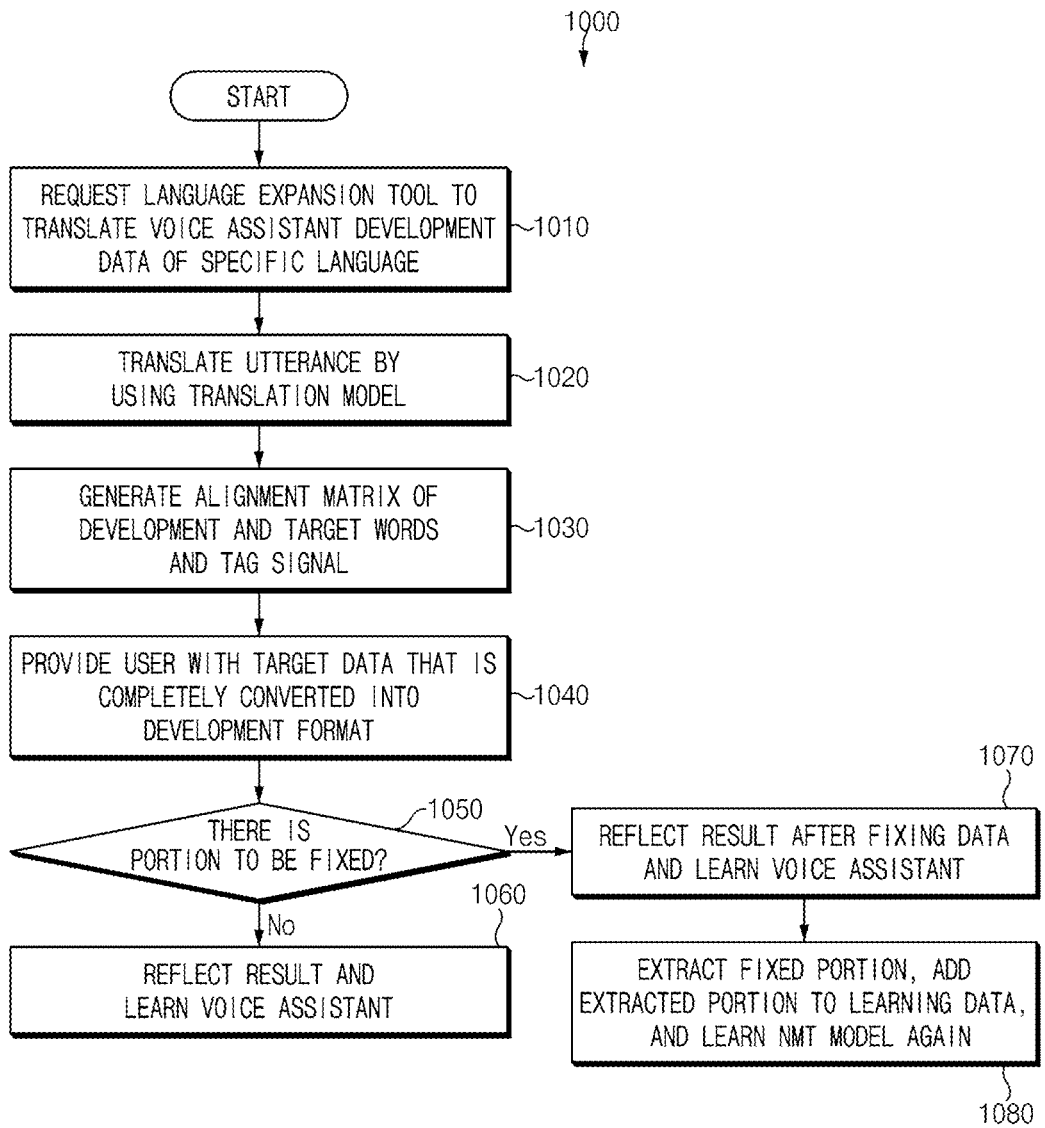
FIG. 10 is a diagram illustrating a method for expanding a language in a tool for developing a speech recognition model, according to an embodiment.

FIG. 10 is a diagram 1000 illustrating a method for expanding a language in a tool for developing a speech recognition model, according to an embodiment. A tool for developing a speech recognition model may completely develop a speech recognition model that supports a specific language such as a development language or native language. The tool for developing the speech recognition model may proceed with multilingual expansions of the speech recognition model that supports a specific language.

In an embodiment, the tool for developing the speech recognition model may convert development data of a voice assistant, which has been completely developed in a specific language, into a target language to be expanded and may provide the result of development data in a target language. The tool for developing the speech recognition model may search for and tag a word parallel to a signal word of the development data in the input target sentence. When it is determined that data entered into the speech recognition model development tool needs to be fixed, the tool for developing the speech recognition model may provide a method in which a developer fixes data and then the fixed data is fed back.

In operation 1010, a method for expanding a language in a tool for developing a speech recognition model according to an embodiment may request an LET to translate voice assistant development data of a specific language. For example, the developer may make a request for a draft translation through the LET, which is built in the tool (e.g., Bixby™ IDE) for developing a speech recognition model. The developer may select the target language to be expanded.

In operation 1020, the method for expanding a language in a tool for developing a speech recognition model according to an embodiment may translate an utterance by using a translation model. The tool for developing the speech recognition model may receive the utterance in the development language so as to be translated into the target language.

The tool for developing the speech recognition model may receive an utterance request and may translate utterances by using the NMT model.

In operation 1030, the method for expanding a language in a tool for developing a speech recognition model according to an embodiment may generate an alignment matrix of development and target words (Development, Target Words) and may tag a signal (Signal). The tool for developing a speech recognition model may translate an utterance in the development language into the target language, and then may generate an aligned matrix by using development words constituting an utterance and target words constituting the translated utterance. The tool for developing speech recognition model may tag a target word having the highest association or similarity score with a word, which is designated as the signal, from among the developed words as the signal.

In operation 1040, the method for expanding a language in a tool for developing a speech recognition model according to an embodiment may provide a user with target data (Target Data), of which the format has been completely converted into a development format (Development Format). The tool for developing the speech recognition model may provide the developer with the target data converted in the same format as the utterance in the development language. For example, after a target language folder that stores target data in the Bixby™ IDE is generated, the target data may be stored in a structure substantially the same as a folder structure and code format of capsule data positioned under a target language folder.

In operation 1050, the method for expanding a language in a tool for developing a speech recognition model according to an embodiment may determine whether there is a portion to be fixed. The tool for developing the speech recognition model may determine the accuracy of translation and signal tagging by comparing the target data and the capsule data.

In operation 1060, the method for expanding a language in a tool for developing a speech recognition model according to an embodiment may reflect a result and may learn a voice assistant. When there is no portion to be fixed in the target data that is the result, the tool for developing the speech recognition model may immediately reflect the target data and then may learn the voice assistant included in the speech recognition model.

In operation 1070, the method for expanding a language in a tool for developing a speech recognition model according to an embodiment may reflect the result after fixing data and may learn the voice assistant. When there is a portion to be fixed in the target data that is the result, the tool for developing the speech recognition model may learn the voice assistant after fixing and reflecting the target data.

In operation 1080, the method for expanding a language in a tool for developing a speech recognition model according to an embodiment may extract the fixed portion, may add the extracted portion to the learning data, and may learn the NMT model again. The tool for developing the speech recognition model may determine the fixed target data as valuable data. The tool for developing the speech recognition model may improve the accuracy and/or performance of the NMT model by learning the fixed target data in the NMT model again.

Figure 11:
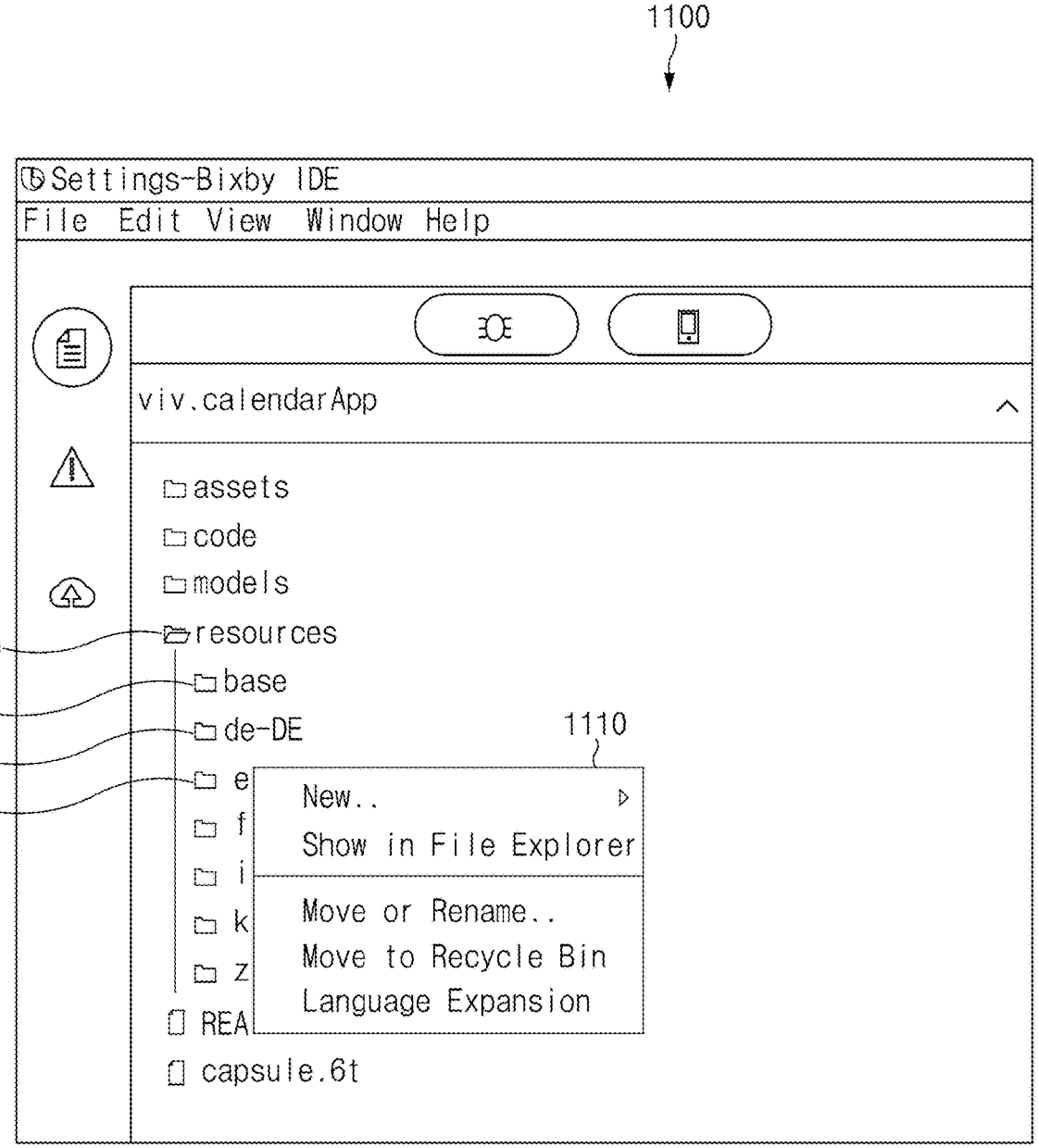
FIG. 11 is a diagram illustrating a user interface screen when a resource folder is selected in a tool for developing a speech recognition model, according to an embodiment.

FIG. 11 is a diagram 1100 illustrating a user interface screen when the resource folder 510 is selected in a tool for developing a speech recognition model, according to an embodiment.

In an embodiment, a tool for developing a speech recognition model may display the resource folder 510 where a developer is capable of identifying capsule data and/or target capsule data, on a user interface screen. The resource folder 510 may include the at least one language folder (511, 512, and/or 513). When the resource folder 510 and/or the single language folder 513 is selected on the user interface screen, a menu 1110 may be displayed on the user interface screen. By using the menu 1110, the developer may generate a new language folder, may displays the selected language folder 513 on a file explorer, may move the selected language folder 513, may rename the selected language folder 513, may delete the selected language folder 513, or may perform language expansion.

Figure 12:
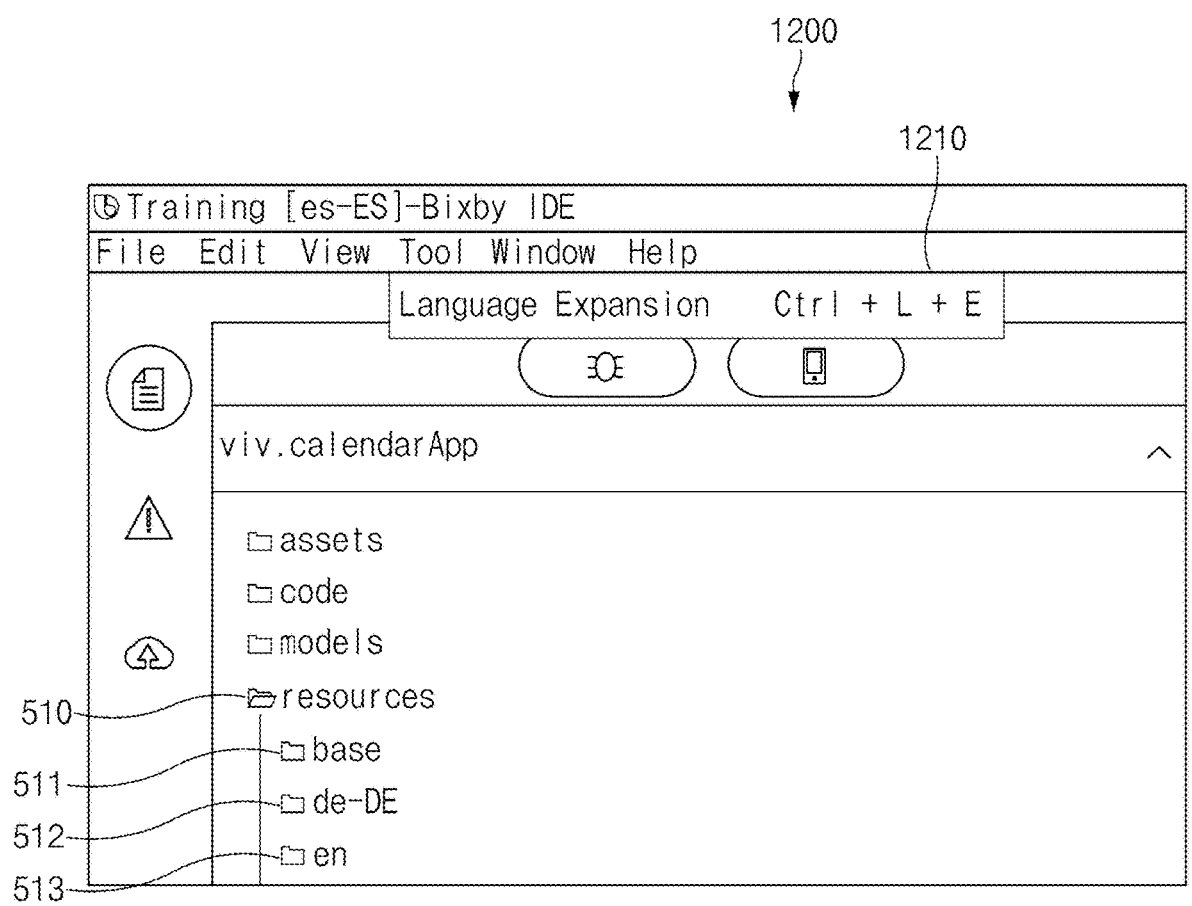
FIG. 12 is a diagram illustrating a user interface screen when a language expansion menu is displayed in a tool for developing a speech recognition model, according to an embodiment.

FIG. 12 is a diagram 1200 illustrating a user interface screen when a language expansion menu 1210 is displayed in a tool for developing a speech recognition model, according to an embodiment.

In an embodiment, a user interface screen of a tool for developing a speech recognition model may display a tool bar above an area where the resource folder 510 is displayed. The tool bar may include functions for a developer's convenience. For example, the tool bar may include 'File', 'Edit', 'View', 'Tool', 'Window', and/or 'Help'. When the tool bar is selected, the language expansion menu 1210 may be displayed. For example, when 'Tool' on the tool bar is selected or a specified shortcut (Ctrl+L+E) is entered, the language expansion menu 1210 may be activated. When the language expansion menu 1210 is clicked, language expansion operations may be performed.

Figure 13:
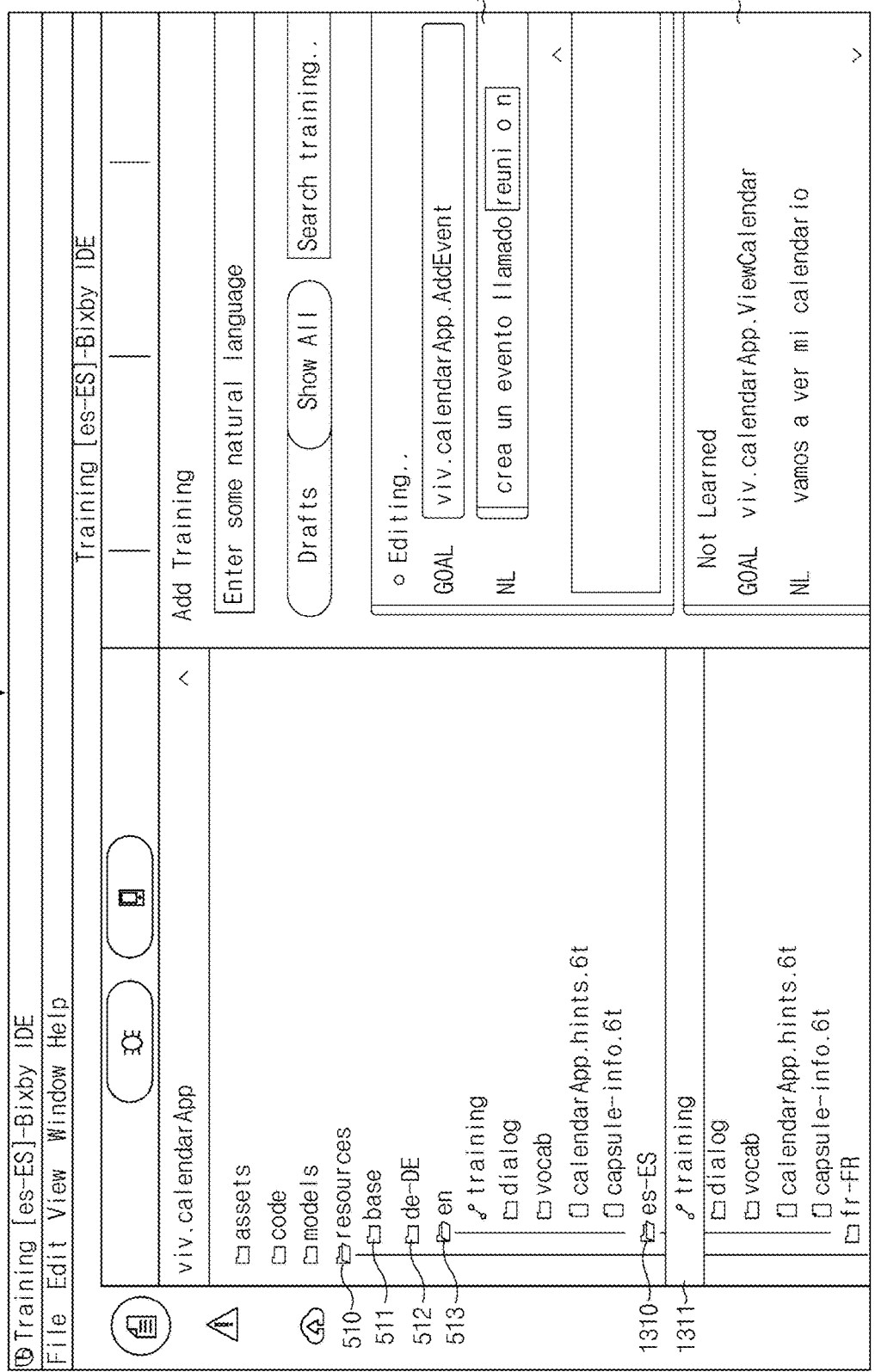
FIG. 13 is a diagram illustrating a user interface screen, on which translation into a target language is performed in a tool for developing a speech recognition model, according to an embodiment.

FIG. 13 is a diagram 1300 illustrating a user interface screen, on which translation into a target language is performed in a tool for developing a speech recognition model, according to an embodiment.

In an embodiment, a tool for developing a speech recognition model may generate a target language folder (es-ES) 1310, which stores target data associated with a target language to be expanded, on a user interface screen. The target language folder 1310 may store target data in the same structure as the resource folder 510. For example, the target language folder 1310 may include a training folder (training) 1311, a dialog folder, and/or a vocabulary folder.

In an embodiment, a developer may select the training folder 1311 included in the target language folder 1310 on the user interface screen of the tool for developing the speech recognition model. The tool for developing a speech recognition model may perform training for expansion to a target language by using source capsule data. For example, the tool for developing the speech recognition model may display target data 1321 (crea un evento llamado reunion) being trained, on the user interface screen. Moreover, the tool for developing the speech recognition model may display a state window 1322 indicating whether to learn (Not Learned) and a goal (GOAL) on the user interface screen.

Figure 14:
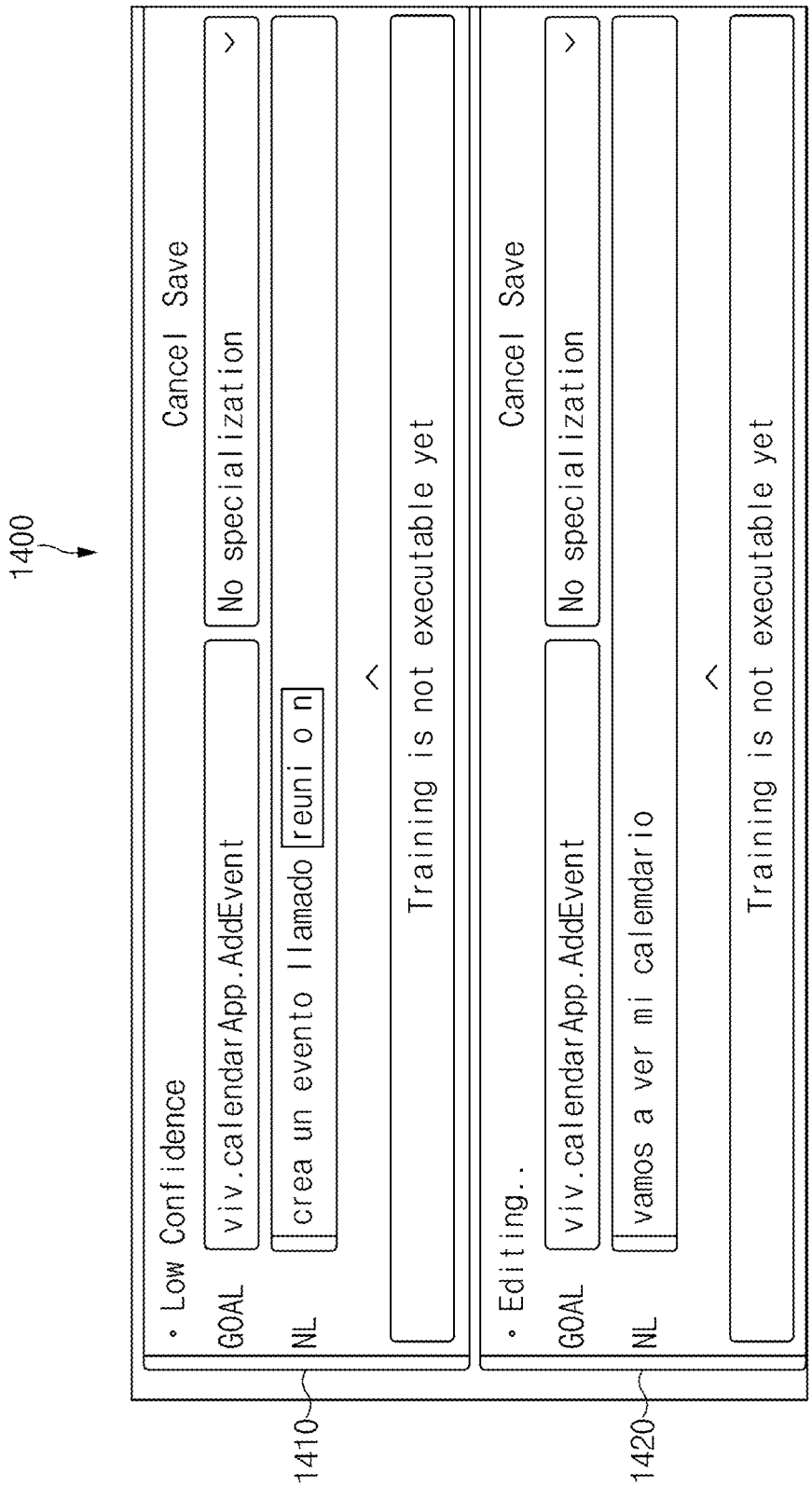
FIG. 14 is a diagram illustrating a user interface screen, on which a result translated into a target language is analyzed in a tool for developing a speech recognition model, according to an embodiment.

FIG. 14 is a diagram 1400 illustrating a user interface screen, on which a result translated into a target language is analyzed in a tool for developing a speech recognition model, according to an embodiment.

In an embodiment, in a tool for developing a speech recognition model, a user interface screen may display a first analysis result 1410 and/or a second analysis result 1420, which is obtained by analyzing a result between a source language and a target language. A result lower than a reference confidence score, reference association, and/or reference similarity score may be displayed in the first analysis result 1410. A result that a confidence score, association, and/or similarity score is being analyzed may be displayed in the second analysis result 1420.

In an embodiment, when the confidence score is set to be lower than a reference value, the tool for developing a speech recognition model may display the fact that the confidence score is set to be lower than the reference value, on the user interface such that a developer is capable of easily identifying results. For example, the first analysis result 1410 may be illustrated as indicating a low confidence state such that the developer easily analyzes results.

Figure 15:
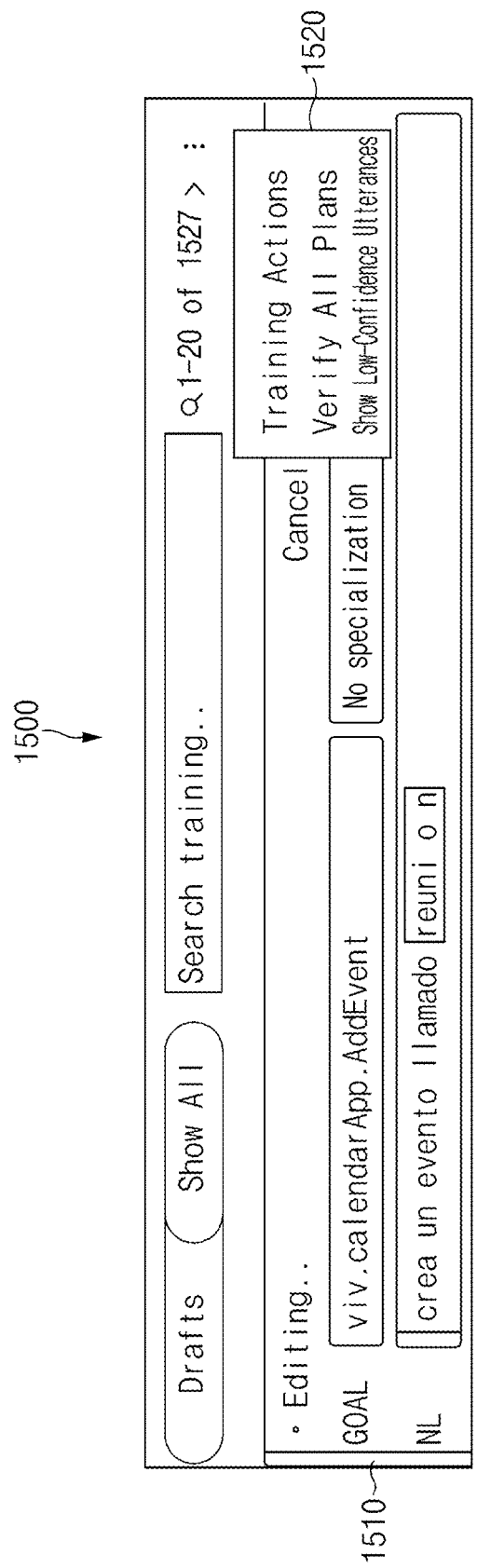
FIG. 15 is a diagram illustrating a user interface screen, on which a result according to a specified criterion is selected and displayed from among results translated into a target language in a tool for developing a speech recognition model, according to an embodiment.

FIG. 15 is a diagram 1500 illustrating a user interface screen, on which a result according to a specified criterion is selected and displayed from among results translated into a target language in a tool for developing a speech recognition model, according to an embodiment.

In an embodiment, in a tool for developing a speech recognition model, a user interface screen may display only a result 1510 according to a specified criterion 1520. For example, on the user interface screen, only the result from a confidence score, association, and/or similarity score is being analyzed may be displayed. In this case, a developer may selectively identify only data that the developer desires to identify.

Figure 16:
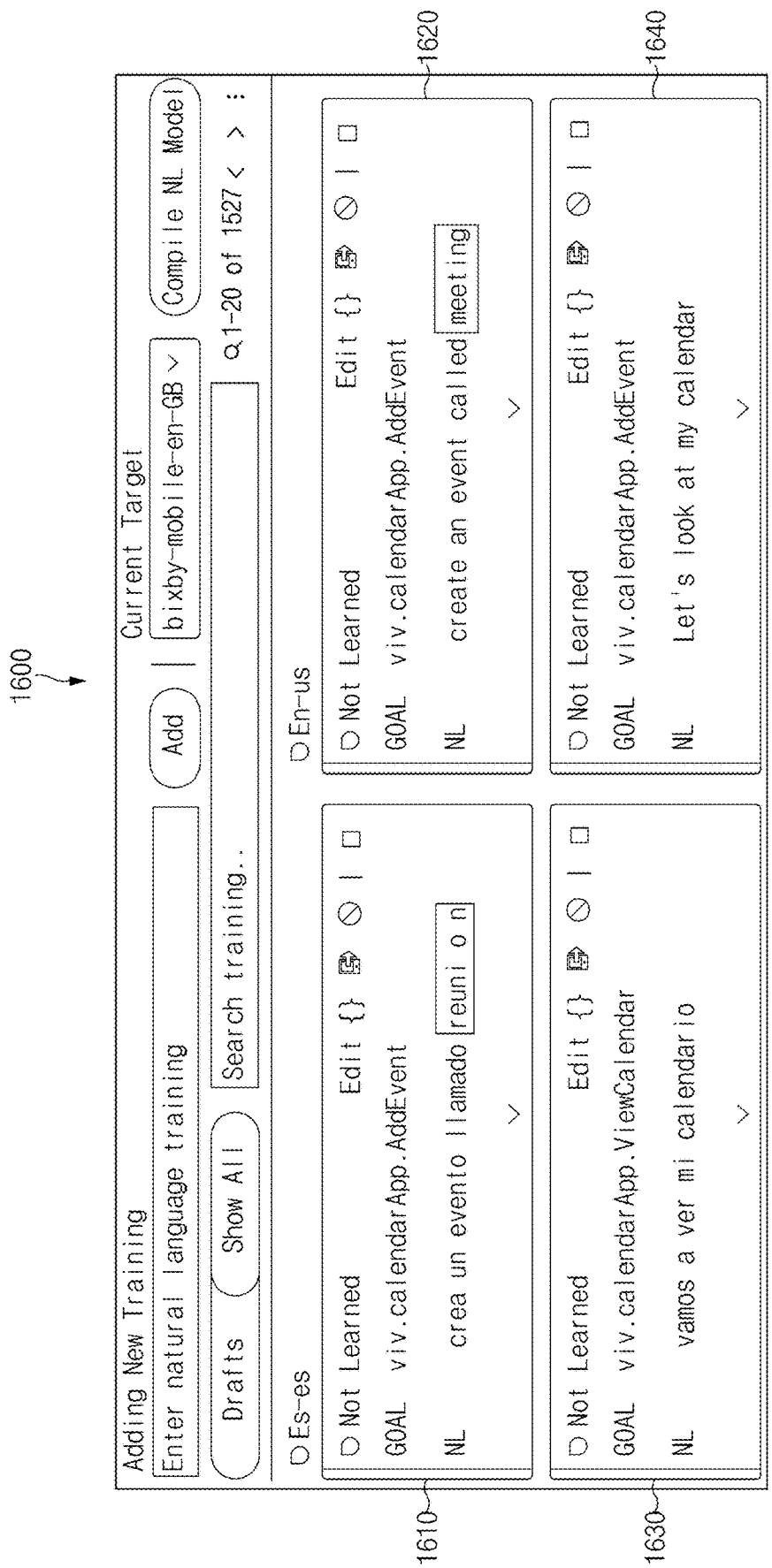
FIG. 16 is a diagram illustrating a user interface screen, on which a development language is compared with a target language in a tool for developing a speech recognition model, according to an embodiment.

FIG. 16 is a diagram 1600 illustrating a user interface screen, on which a source language is compared with a target language in a tool for developing a speech recognition model, according to an embodiment.

In an embodiment, a tool for developing a speech recognition model may display at least one source language (En-us) data (1620, 1640) and at least one target language (Es-es) data (1610, 1630). The tool for developing the speech recognition model may display the source language data (1620, 1640) having substantially the same meaning as the translated target language data (1610, 1630) so as to be adjacent to each other on the user interface screen.

Figure 17:
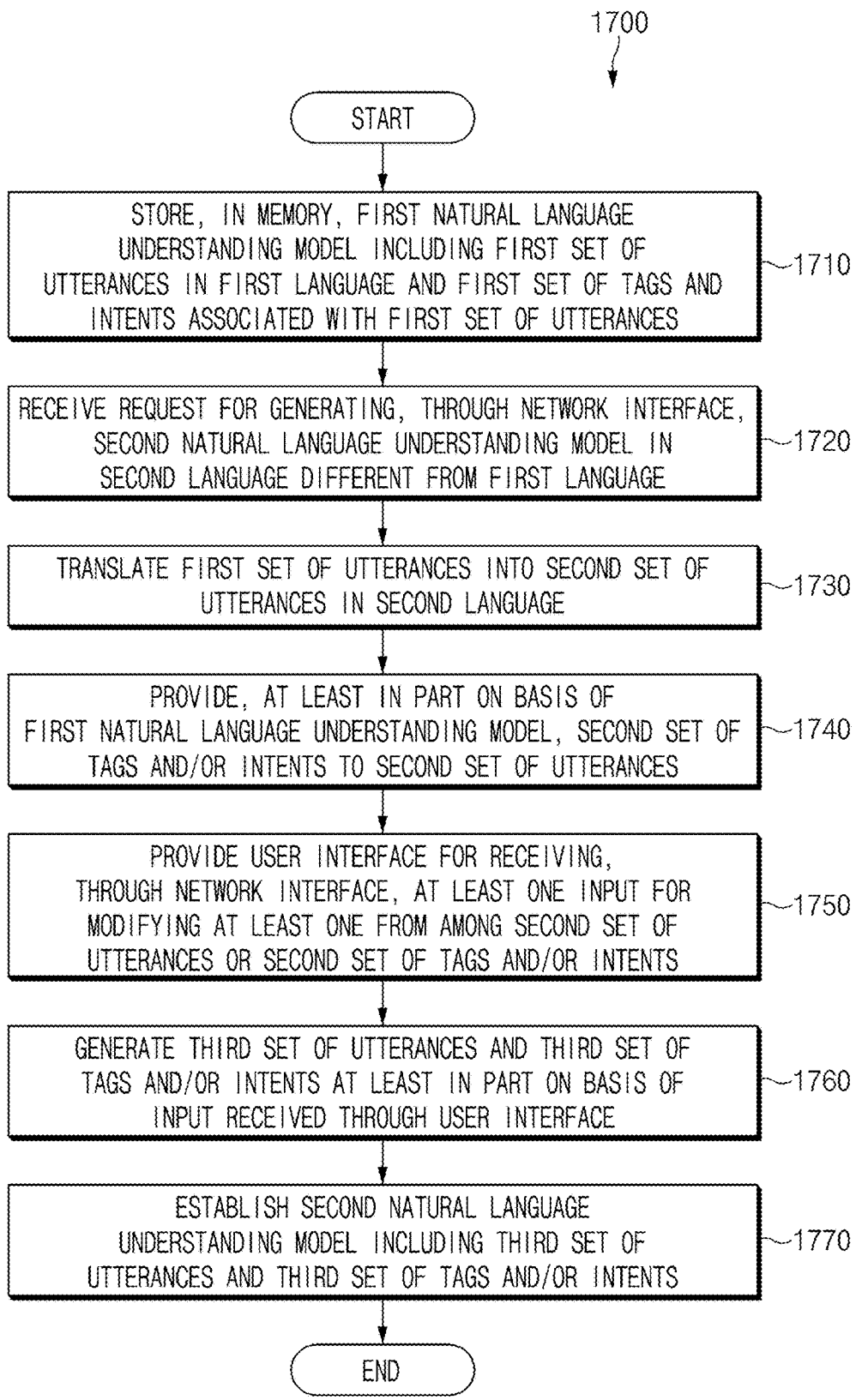
FIG. 17 is an operation flowchart of a system, according to an embodiment.
Figure 18:
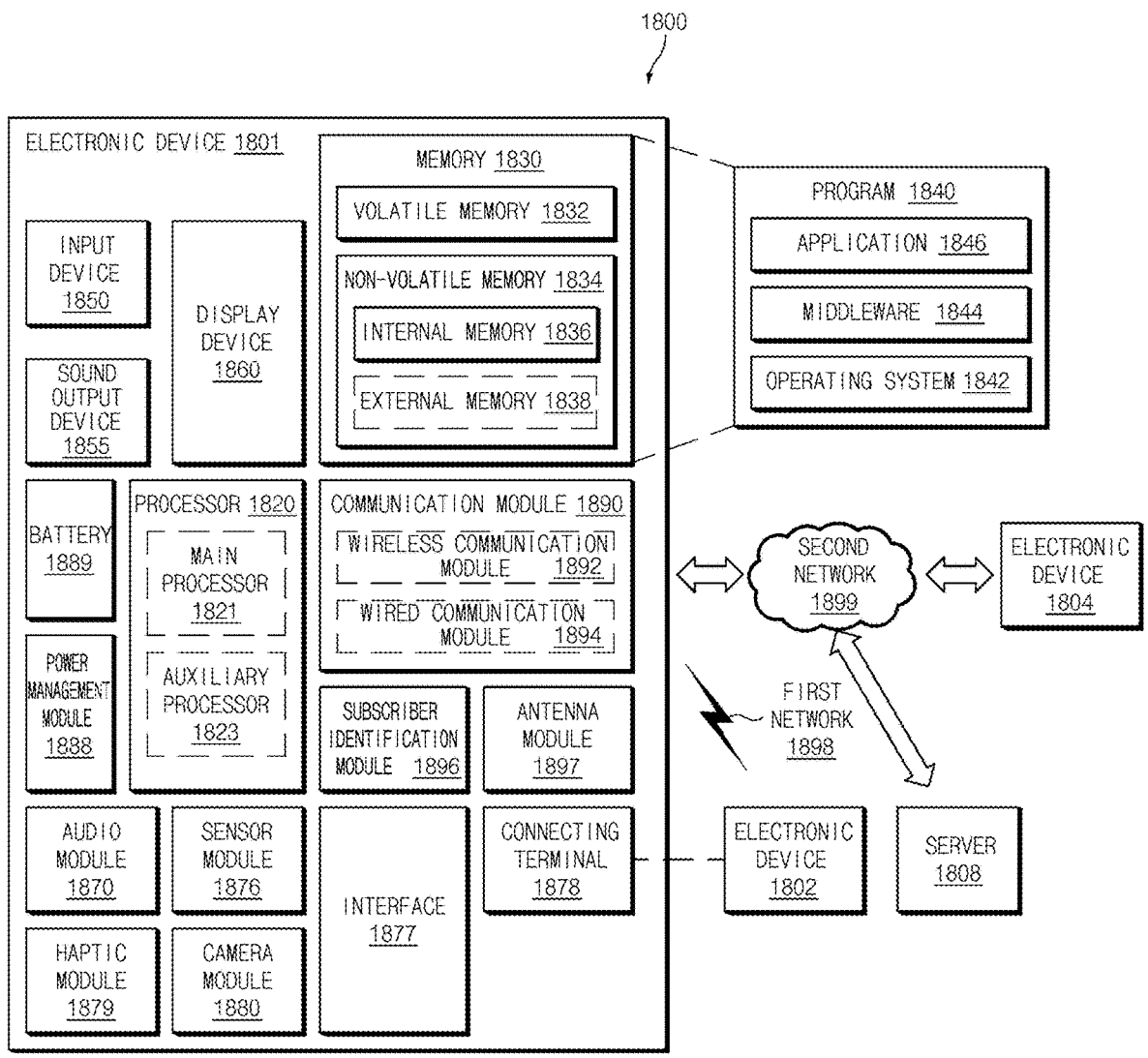
FIG. 18 is a block diagram illustrating an electronic device in a network environment according to various embodiments.

FIG. 17 is an operation flowchart 1700 of a system (e.g., a network environment 1800 including an electronic device 1801 of FIG. 18), according to an embodiment. The system 1800 according to an embodiment may include a network interface (e.g., an interface 1877 of FIG. 18), at least one processor (e.g., a processor 1820 of FIG. 18) operatively connected to the network interface 1877, and at least one memory (e.g., a memory 1830 of FIG. 18) operatively connected to the processor 1820.

In operation 1710, the system 1800 according to an embodiment may store a first NLU model including a first set of utterances in a first language and a first set of tags and intents associated with the first set of utterances. The first language may be a development language. The first set of utterances may include information associated with expressions, dialogs, and/or vocabularies in the first language. The first set of tags and intents is expressed in the first language, and may be operations, purposes, and/or goals that the system will perform. The first NLU model stored in the memory 1830 may extract tags and intents from an input in the first language, and may perform operations associated with the extracted tags and intents.

In operation 1720, the system 1800 according to an embodiment may receive a request for generating a second NLU model in a second language different from the first language through the network interface 1877. The first NLU model stored in the memory 1830 may fail to extract tags or intents from an input in the second language. When a user employs the second language, the processor 1820 may use the second NLU model to extract tags or intents from an input. The user or a developer of an NLU model may request the processor 1820 through the network interface 1877 to generate the second NLU model.

In operation 1730, the system 1800 according to an embodiment may translate the first set of utterances into a second set of utterances in the second language. The processor 1820 may translate expressions, dialogs, and/or vocabularies included in the first set of utterances from the first language to the second language. The processor 1820 may generate the second set of utterances by translating content of the first set of utterances from the first language to the second language.

In operation 1740, the system 1800 according to an embodiment may provide, based at least partly on the first NLU model, a second set of tags and/or intents to the second set of utterances. The processor 1820 may designate, as the second set of tags and/or intents, expressions and/or vocabularies having meanings corresponding to the first set of tags and/or intents included in the first NLU model. The processor 1820 may select, as the second set of tags and/or intents, the expressions and/or vocabularies having meanings corresponding to the first set of tags and/or intents included in the first NLU model from the generated second set of utterances.

In operation 1750, the system 1800 according to an embodiment may provide a user interface for receiving, through the network interface, at least one input for fixing at least one from among the second set of utterances or the second set of tags and/or intents. To increase the accuracy of the second set of utterances, a user who performs an input in the second language or a developer who generates the second NLU model may request the processor 1820 to modify information associated with the second set of utterances or the second set of tags and/or intents. The network interface 1877 may provide a user interface for receiving the modification request by using an input device (e.g., the input device 1850 of FIG. 18) or a display device (e.g., the display device 1860 of FIG. 18).

In operation 1760, the system 1800 according to an embodiment may generate a third set of utterances and a third set of tags and/or intents based at least partly on the input received through a user interface. The processor 1820 may correct linguistic and/or content errors of the second set of utterances and the second set of tags and/or intents in the second language from the input received through the user interface. The processor 1820 may generate the third set of utterances and the third set of tags and/or intents, which are made up of the second language and which increase accuracy associated with expressions, grammars, and/or vocabularies in the second language.

In operation 1770, the system 1800 according to an embodiment may establish the second NLU model including the third set of utterances and the third set of tags and/or intents. The processor 1820 may generate the second NLU model, which is made up of the second language and which increases accuracy associated with expressions, grammars, and/or vocabularies in the second language.

FIG. 18 is a block diagram illustrating an electronic device 1801 in a network environment 1800 according to various embodiments. Referring to FIG. 18, the electronic device 1801 in the network environment 1800 may communicate with an electronic device 1802 via a first network 1898 (e.g., a short-range wireless communication network), or an electronic device 1804 or a server 1808 via a second network 1899 (e.g., a long-range wireless communication network). According to an embodiment, the electronic device 1801 may communicate with the electronic device 1804 via the server 1808. According to an embodiment, the electronic device 1801 may include a processor 1820, memory 1830, an input device 1850, a sound output device 1855, a display device 1860, an audio module 1870, a sensor module 1876, an interface 1877, a haptic module 1879, a camera module 1880, a power management module 1888, a battery 1889, a communication module 1890, a subscriber identification module (SIM) 1896, or an antenna module 1897. In some embodiments, at least one (e.g., the display device 1860 or the camera module 1880) of the components may be omitted from the electronic device 1801, or one or more other components may be added in the electronic device 1801. In some embodiments, some of the components may be implemented as single integrated circuitry. For example, the sensor module 1876 (e.g., a fingerprint sensor, an iris sensor, or an illuminance sensor) may be implemented as embedded in the display device 1860 (e.g., a display).

The processor 1820 may execute, for example, software (e.g., a program 1840) to control at least one other component (e.g., a hardware or software component) of the electronic device 1801 coupled with the processor 1820, and may perform various data processing or computation. According to one embodiment, as at least part of the data processing or computation, the processor 1820 may load a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor (AP)), and an auxiliary processor 1823 (e.g., a graphics processing unit (GPU), an image signal processor (ISP), a sensor hub processor, or a communication processor (CP)) that is operable independently from, or in conjunction with, the main processor 1821. Additionally or alternatively, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display device 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 1823.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input device 1850 may receive a command or data to be used by other component (e.g., the processor 1820) of the electronic device 1801, from the outside (e.g., a user) of the electronic device 1801. The input device 1850 may include, for example, a microphone, a mouse, a keyboard, or a digital pen (e.g., a stylus pen).

The sound output device 1855 may output sound signals to the outside of the electronic device 1801. The sound output device 1855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1860 may visually provide information to the outside (e.g., a user) of the electronic device 1801. The display device 1860 may include, for example, a display, a hologram device, or a projector and control circuitry to control a corresponding one of the display, hologram device, and projector. According to an embodiment, the display device 1860 may include touch circuitry adapted to detect a touch, or sensor circuitry (e.g., a pressure sensor) adapted to measure the intensity of force incurred by the touch.

The audio module 1870 may convert a sound into an electrical signal and vice versa. According to an embodiment, the audio module 1870 may obtain the sound via the input device 1850, or output the sound via the sound output device 1855 or a headphone of an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to one embodiment, the power management module 1888 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™, wireless-fidelity (Wi-Fi) direct, or infrared data association (IrDA)) or the second network 1899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The antenna module 1897 may transmit or receive a signal or power to or from the outside (e.g., the external electronic device) of the electronic device 1801. According to an embodiment, the antenna module 1897 may include an antenna including a radiating element composed of a conductive material or a conductive pattern formed in or on a substrate (e.g., PCB). According to an embodiment, the antenna module 1897 may include a plurality of antennas. In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to an embodiment, another component (e.g., a radio frequency integrated circuit (RFIC)) other than the radiating element may be additionally formed as part of the antenna module 1897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 and 1804 may be a device of a same type as, or a different type, from the electronic device 1801. According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1840) including one or more instructions that are stored in a storage medium (e.g., internal memory 1836 or external memory 1838) that is readable by a machine (e.g., the electronic device 1801). For example, a processor (e.g., the processor 1820) of the machine (e.g., the electronic device 1801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a communication circuit;
at least one processor; and
at least one memory storing a first natural language understanding (NLU) model including a first set of utterances in a first language and a first set of tags and intents associated with the first set of utterances,
wherein the memory stores instructions that, when executed, cause the at least one processor to:
receive a request for generating, through the communication circuit, a second NLU model in a second language different from the first language from an external user device;
translate the first set of utterances into a second set of utterances in the second language by using a neural machine translation (NMT) model;
determine, based on the first NLU model, a second set of tags or intents associated with the second set of utterances, wherein the second set of tags or intents corresponds to the first set of tags and intents;
provide a user interface for receiving, through the communication circuit, at least one user input for fixing at least one from among the second set of utterances or the second set of tags or intents to the external user device;
receive the at least one user input from the external user device;
generate a third set of utterances and a third set of tags or intents based on the at least one user input and the fixed at least one of the second set of utterances or the second set of tags or intents; and
generate the second NLU model including the third set of utterances and the third set of tags or intents.

2. The electronic device of claim 1, wherein:
the first language is a development language,
a capsule database includes pieces of data used to develop the first NLU model, and
the capsule database includes language data, which is data different for each language, and non-verbal data, which is substantially the same data regardless of a type of a language.

3. The electronic device of claim 1, wherein:
the translating of the first set of utterances into the second set of utterances in the second language is performed by using translation data including the first language and the second language,
the translation data is data generated by using the neural machine translation (NMT) model, and
the NMT model continuously improves performance or accuracy of translation by using machine learning (ML).

4. The electronic device of claim 2, wherein the non-verbal data includes an intonation, accent, or speed of an utterance of a user.

5. The electronic device of claim 1, wherein the instructions, when executed, further cause the at least one processor to:
extract training data or dialog data, which is used to develop a speech recognition model for the second language that is a language to be expanded, as capsule data.

6. The electronic device of claim 1, wherein the first language corresponds to a user utterance in a specific language, for which a speech recognition model is completely developed, or a language entered by a developer and is translated into the second language by applying data including the first set of utterances and the second set of utterances to the first language.

7. The electronic device of claim 1, wherein the instructions, when executed, further cause the at least one processor to:
set, to a signal, a word included in the second set of utterances, which has a parallel relationship having a meaning corresponding to the signal included in the first set of tags or intents.

8. The electronic device of claim 1, wherein the instructions, when executed, further cause the at least one processor to:
modify the second set of utterances to the third set of utterances in response to the at least one user input; and
modify or refine the second NLU model by using the third set of utterances as learning data for training the NMT model again.

9. An electronic device, to which a method for expanding a language used in a speech recognition model is applied, comprising:
a data processor configured to extract language data from capsule data;
a capsule database configured to generate translation data by using the language data;
a neural machine translation (NMT) model configured to receive a development language and to translate the development language into a target language,
wherein the data processor is configured to:
generate target capsule data in the target language by combining the translation data with a structure, and
wherein the NMT model is configured to:
tag a target word corresponding to a signal of the development language; and
add fixed learning data to a learning model,
wherein the NMT model is further configured to translate each of training data, dialog data, or vocabulary data in the development language into the target language by using an NMT core included in the NMT model, and
wherein the data processor is further configured to generate the target capsule data by reassembling or combining the training data, the dialog data, or the vocabulary data translated into the target language with a capsule structure.

10. The electronic device of claim 9, wherein each of the training data, the dialog data, or the vocabulary data translated into the target language returns to the capsule database.

11. The electronic device of claim 9, wherein the NMT model translates training data into the target language by using the NMT model and tags a slot, which is an important concept or target for performing an operation indicated by an utterance of the training data translated into the target language.

12. The electronic device of claim 9, wherein the NMT model generates an alignment matrix by using a word of an utterance in the development language and a word of an utterance translated into the target language.

13. The electronic device of claim 12, further comprising:
a slot transition module configured to obtain the alignment matrix and the utterance translated into the target language,
wherein the slot transition module tags a word having a meaning corresponding to a signal, which is a word tagged with a slot in the development language, as the signal in the utterance translated into the target language.

14. A method for an electronic device comprising:
storing, in a memory of the electronic device, a first natural language understanding (NLU) model including a first set of utterances in a first language and a first set of tags and intents associated with the first set of utterances,
receiving, from an external user device, a request for generating a second NLU model in a second language different from the first language;
translating the first set of utterances into a second set of utterances in the second language by using a neural machine translation (NMT) model;
determining, based on the first NLU model, a second set of tags or intents associated with the second set of utterances, wherein the second set of tags or intents corresponds to the first set of tags and intents;
providing a user interface for receiving at least one user input for fixing at least one from among the second set of utterances or the second set of tags or intents to the external user device;
receiving the at least one user input from the external user device;
generating a third set of utterances and a third set of tags or intents based on the at least one user input and the fixed at least one of the second set of utterances or the second set of tags or intents; and
generating the second NLU model including the third set of utterances and the third set of tags or intents.

15. The method of claim 14, wherein:
the first language is a development language,
a capsule database includes pieces of data to develop the first NLU model, and
the capsule database includes language data, which is data different for each language, and non-verbal data, which is substantially the same data regardless of a type of a language.

16. The method of claim 14, wherein:
the translating of the first set of utterances into the second set of utterances in the second language is performed by using translation data including the first language and the second language,
the translation data is data generated by using the neural machine translation (NMT), and
the NMT continuously improves performance or accuracy of translation by using machine learning (ML).

17. The method of claim 15, wherein the non-verbal data includes an intonation, accent, or speed of an utterance of a user.

18. The method of claim 14, further comprising:
extracting training data or dialog data, which is used to develop a speech recognition model for the second language that is a language to be expanded, as capsule data.

* * * * *